United States Patent
Vasanad et al.

(10) Patent No.: US 12,355,619 B2
(45) Date of Patent: Jul. 8, 2025

(54) MULTI-TIER DEPLOYMENT ARCHITECTURE FOR DISTRIBUTED EDGE DEVICES

(71) Applicant: Oracle International Corporation, Redwood Shores, CA (US)

(72) Inventors: Naren Vasanad, Fremont, CA (US); Harshit Kumar Kalley, Sunnyvale, CA (US); Srikanth Vavilapalli, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/331,900

(22) Filed: Jun. 8, 2023

(65) Prior Publication Data

US 2024/0414049 A1   Dec. 12, 2024

(51) Int. Cl.
*H04L 41/0806* (2022.01)
(52) U.S. Cl.
CPC .............................. *H04L 41/0806* (2013.01)
(58) Field of Classification Search
None
See application file for complete search history.

(56) References Cited

U.S. PATENT DOCUMENTS

| | | | |
|---|---|---|---|
| 8,613,070 | B1 | 12/2013 | Borzycki et al. |
| 10,187,323 | B2 | 1/2019 | Laplanche et al. |
| 10,404,613 | B1 | 9/2019 | Brooker et al. |
| 11,032,164 | B1 | 6/2021 | Rothschild et al. |
| 11,201,794 | B1 | 12/2021 | Guo et al. |
| 11,271,807 | B1 | 3/2022 | Rothschild et al. |
| 11,314,601 | B1 | 4/2022 | Natanzon et al. |
| 11,349,710 | B1 | 5/2022 | Nelson et al. |
| 11,509,715 | B2 | 11/2022 | Rafey et al. |
| 11,573,816 | B1 | 2/2023 | Featonby et al. |
| 11,579,911 | B1 | 2/2023 | Santos et al. |
| 11,647,103 | B1 | 5/2023 | Pinho et al. |

(Continued)

OTHER PUBLICATIONS

U.S. Appl. No. 17/531,566 , Notice of Allowance, Mailed on Mar. 21, 2023, 10 pages.

(Continued)

*Primary Examiner* — Scott B Christensen
(74) *Attorney, Agent, or Firm* — Kilpatrick Townsend & Stockton LLP

(57) ABSTRACT

Techniques discussed herein relate to implementing a distributed computing cluster (the "cluster") including a plurality of edge devices (e.g., devices individually configured to selectively execute within an isolated computing environment). Each of the edge devices of the cluster may be configured with a respective control plane computing component. A subset of the edge devices may be selected to operate in a distributed control plane of the computing cluster. Any suitable combination of the subset selected to operate in the distributed control plane can instruct remaining edge devices of the distributed computing cluster to disable at least a portion of their respective control planes. Using these techniques, the cluster's distributed control plane can be configured and modified to scale as the cluster grows. The edge devices of the control plane may selectively connect to a centralized cloud, alleviating the remaining edge devices from needless and costly connections.

20 Claims, 16 Drawing Sheets

(56) References Cited

U.S. PATENT DOCUMENTS

| | | |
|---|---|---|
| 11,683,220 B2 | 6/2023 | Maheshwari et al. |
| 11,693,669 B2 | 7/2023 | Kamath et al. |
| 11,722,867 B2 | 8/2023 | Doken |
| 11,743,344 B1 | 8/2023 | Sivaswamy et al. |
| 11,915,059 B2 | 2/2024 | Vasanad et al. |
| 11,936,757 B1 | 3/2024 | Benny et al. |
| 12,106,085 B2 | 10/2024 | Patil |
| 2011/0035747 A1 | 2/2011 | Machida |
| 2011/0276951 A1 | 11/2011 | Jain |
| 2012/0303818 A1 | 11/2012 | Thibeault et al. |
| 2013/0332927 A1 | 12/2013 | Tang et al. |
| 2015/0046591 A1 | 2/2015 | Zhu et al. |
| 2015/0142878 A1 | 5/2015 | Hebert et al. |
| 2015/0324215 A1 | 11/2015 | Borthakur |
| 2017/0244647 A1 | 8/2017 | Jin et al. |
| 2018/0103088 A1 | 4/2018 | Blainey et al. |
| 2019/0007339 A1 | 1/2019 | Bao et al. |
| 2019/0036687 A1 | 1/2019 | Raza et al. |
| 2019/0042319 A1 | 2/2019 | Sood et al. |
| 2019/0064787 A1 | 2/2019 | Maturana |
| 2019/0065545 A1 | 2/2019 | Hazel et al. |
| 2019/0129745 A1 | 5/2019 | Wang |
| 2019/0266170 A1 | 8/2019 | Hazel et al. |
| 2019/0324786 A1 | 10/2019 | Ranjan et al. |
| 2020/0073649 A1 | 3/2020 | Viana et al. |
| 2020/0089515 A1 | 3/2020 | Hari |
| 2020/0351337 A1 | 11/2020 | Calmon et al. |
| 2021/0067599 A1 | 3/2021 | Gill et al. |
| 2021/0136178 A1 | 5/2021 | Casey et al. |
| 2021/0144517 A1 | 5/2021 | Guim Bernat et al. |
| 2021/0149648 A1 | 5/2021 | Velammal et al. |
| 2021/0273987 A1 | 9/2021 | You et al. |
| 2021/0303364 A1 | 9/2021 | Chiu |
| 2022/0004410 A1 | 1/2022 | Chen |
| 2022/0116455 A1 | 4/2022 | Raghunath et al. |
| 2022/0188569 A1 | 6/2022 | Ananthanarayanan et al. |
| 2022/0209992 A1 | 6/2022 | Ritchie et al. |
| 2022/0256647 A1 | 8/2022 | Salmasi et al. |
| 2022/0327003 A1 | 10/2022 | Shankar et al. |
| 2022/0327007 A1* | 10/2022 | Adogla ............... C07K 16/2818 |
| 2022/0357975 A1 | 11/2022 | Huang et al. |
| 2022/0377146 A1* | 11/2022 | Shankar ............... H04L 41/5051 |
| 2022/0394084 A1 | 12/2022 | Chen et al. |
| 2023/0011628 A1 | 1/2023 | Hurley et al. |
| 2023/0049501 A1 | 2/2023 | Xu et al. |
| 2023/0177349 A1 | 6/2023 | Balakrishnan et al. |
| 2023/0231903 A1 | 7/2023 | Zeng |
| 2023/0269126 A1 | 8/2023 | Parthasarathy et al. |
| 2023/0315438 A1 | 10/2023 | Suto et al. |
| 2023/0315505 A1 | 10/2023 | Erukulla et al. |
| 2024/0028414 A1 | 1/2024 | Vasanad et al. |

OTHER PUBLICATIONS

U.S. Appl. No. 17/565,337, Notice of Allowance, Mailed on May 11, 2023, 11 pages.

U.S. Appl. No. 17/581,804, "Notice of Allowance", mailed Jul. 9, 2024, 22 pages.

Azab et al., "Migrate: Towards a Lightweight Moving-target Defense Against Cloud Side-channels", 2016 Institute of Electrical and Electronics Engineers Symposium on Security and Privacy Workshops, 2016, pp. 96-103.

U.S. Appl. No. 17/875,249, Notice of Allowance mailed on Nov. 24, 2023, 11 pages.

U.S. Appl. No. 18/540,650, "Non-Final Office Action", mailed Nov. 4, 2024, 15 pages.

* cited by examiner

MULTI-TIER DEPLOYMENT ARCHITECTURE FOR DISTRIBUTED EDGE DEVICES

BACKGROUND

In cloud computing, processing and storage is generally performed by one or more service providers implemented at a centralized location. Data can be received from customers at the centralized location, processed there, and then the processed (or other) data can be transmitted back to customers. However, having a centralized location for cloud infrastructure components may not be ideal in various scenarios. For example, when there are hundreds or thousands of Internet of Things (IoT) devices transmitting data to the central servers, and especially when those IoT devices are not geographically close to the cloud infrastructure computing devices, conventional centralized systems are not ideal. These IoT devices may be considered on the "edge," as in they are not close to the central servers.

Additionally, there may be other instances when the centralized location for cloud components is less than ideal. For example, if the data is collected (e.g., by IoT devices) in a disconnected region or a location with no Internet connectivity (e.g., remote locations). Current centralized cloud computing environments may not meet time sensitivity requirements when streaming data due to the inherent latency of their wide-area network connections. Remotely generated data may need to be processed more quickly (e.g., to detect anomalies) than conventional centralized cloud computing systems allow. Thus, there are challenges with managing a traditional cloud computing environment that relies on centralized components. For example, a centralized workflow manager may be suboptimal for managing workflows at geographically remote devices.

At times, it may be desirable to perform updates, modify aspects of the geographically remote devices, synchronize data from the geographically remote devices to the central cloud servers, and the like. As these geographically remote devices can have sporadic network connections, it is advantageous and desirable to control the manner in which these tasks are performed.

BRIEF SUMMARY

Techniques are provided (e.g., a method, a system, an edge device, a non-transitory computer-readable medium storing code or instructions executable by one or more processors) for configuring, implementing, and/or utilizing one or more edge devices as a control plane (e.g., a distributed control plane) of a distributed computing cluster including any suitable number of edge devices. An edge device refers to a computing device that is configured to deliver computing and/or storage remote locations separate from a centralized cloud computing environment (e.g., a data center, etc.), also referred to as a "centralized cloud," for brevity. Edge devices may, at least at times, lack a public/private network connection to other edge devices (e.g., edge devices operating as a distributed cluster) and/or to the centralized cloud servers. Various embodiments are described herein, including methods, systems, non-transitory computer-readable storage media storing programs, code, or instructions executable by one or more processors, and the like.

At least one embodiment is directed to a method. The method may include implementing, at least in part by a first edge device, a distributed computing cluster including a plurality of edge devices comprising the first edge device. In some embodiments, each of the plurality of edge devices may be individually configured with a corresponding control plane computing component that is configured to control the distributed computing cluster. In some embodiments, the plurality of edge devices may be configured to selectively execute within an isolated computing environment. While executing within the isolated computing environment, the plurality of edge devices may have no access to a public network. The method may further include obtaining, by the first edge device, data indicating that the first edge device has been selected as part of a distributed control plane of the distributed computing cluster. In some embodiments, the first edge device provides a first set of control plane operations while operating as part of the distributed control plane of the distributed computing cluster. The method may include identifying, by the first edge device, a set of edge devices from the plurality of edge devices of the distributed computing cluster. The method may include transmitting, by the first edge device, instructions to at least a second edge device of the set of edge devices. In some embodiments, the second edge device may disable, on receipt of the instructions from the first edge device, a portion of a respective control plane of the second edge device. In some embodiments, the second edge device provides a second set of control plane operations while the portion of the respective control plane is disabled.

In some embodiments, obtaining the data indicating that the first edge device has been selected to operate as part of the distributed control plane of the distributed computing cluster includes at least one of: 1) obtaining the data from local memory of the first edge device, or 2) receiving, from a user interface hosted by the first edge device, user input comprising the data.

In some embodiments, the method may include any suitable combination of 1) receiving, by the first edge device operating as part of the distributed control plane, a request to launch an instance on the second edge device of the set of edge devices, and 2) transmitting, by the first edge device, additional instructions to the second edge device to launch the instance. In some embodiments, the second edge device may be configured to execute corresponding operations to launch the instance in response to receiving the additional instructions.

In some embodiments, the method may include receiving, by the first edge device operating as part of the distributed control plane, a request to synchronize second data stored in memory at the second edge device. The method may include requesting, by the first edge device from the second edge device, the second data stored in the memory at the second edge device. In some embodiments, the method may include receiving, by the first edge device, the second data stored in the memory at the second edge device. The method may include transmitting, by the first edge device to a central cloud server, the second data received from the second edge device.

In some embodiments, the first edge device, while operating as part of the distributed control plane, periodically connects via the public network to one or more central cloud servers of a centralized cloud environment.

The method may include any suitable combination of 1) receiving, by the first edge device operating as part of the distributed control plane, a request to perform an update at the second edge device, 2) transmitting, by the first edge device to the second edge device via the corresponding control plane computing component executing at the first edge device, update data that is associated with performing the update at the second edge device, and/or 3) transmitting, by the first edge device to the second edge device via the corresponding control plane computing component executing at the first edge device, update instructions. In some embodiments, the second edge device may be configured to perform the update in response to receiving the update instructions and in accordance with the update data received from the first edge device.

In some embodiments, the portion of the respective control plane of the second edge device that is disabled includes a corresponding control plane computing component.

In some embodiments, an edge device is disclosed. The edge device may operate alone, or as part of a computing cluster of a plurality of edge devices. In some embodiments, the edge device comprises one or more processors and one or more (non-transitory) memories configured with computer-executable instructions that, when executed by the one or more processors, cause the edge device to perform any suitable method disclosed herein.

Some embodiments disclose a non-transitory computer-readable medium comprising computer-executable instructions that, when executed with one or more processors of an edge device (e.g., an edge device operating as part of a computing cluster of edge devices, cause the edge device to perform any suitable method disclosed herein.

DETAILED DESCRIPTION

Figure 1:
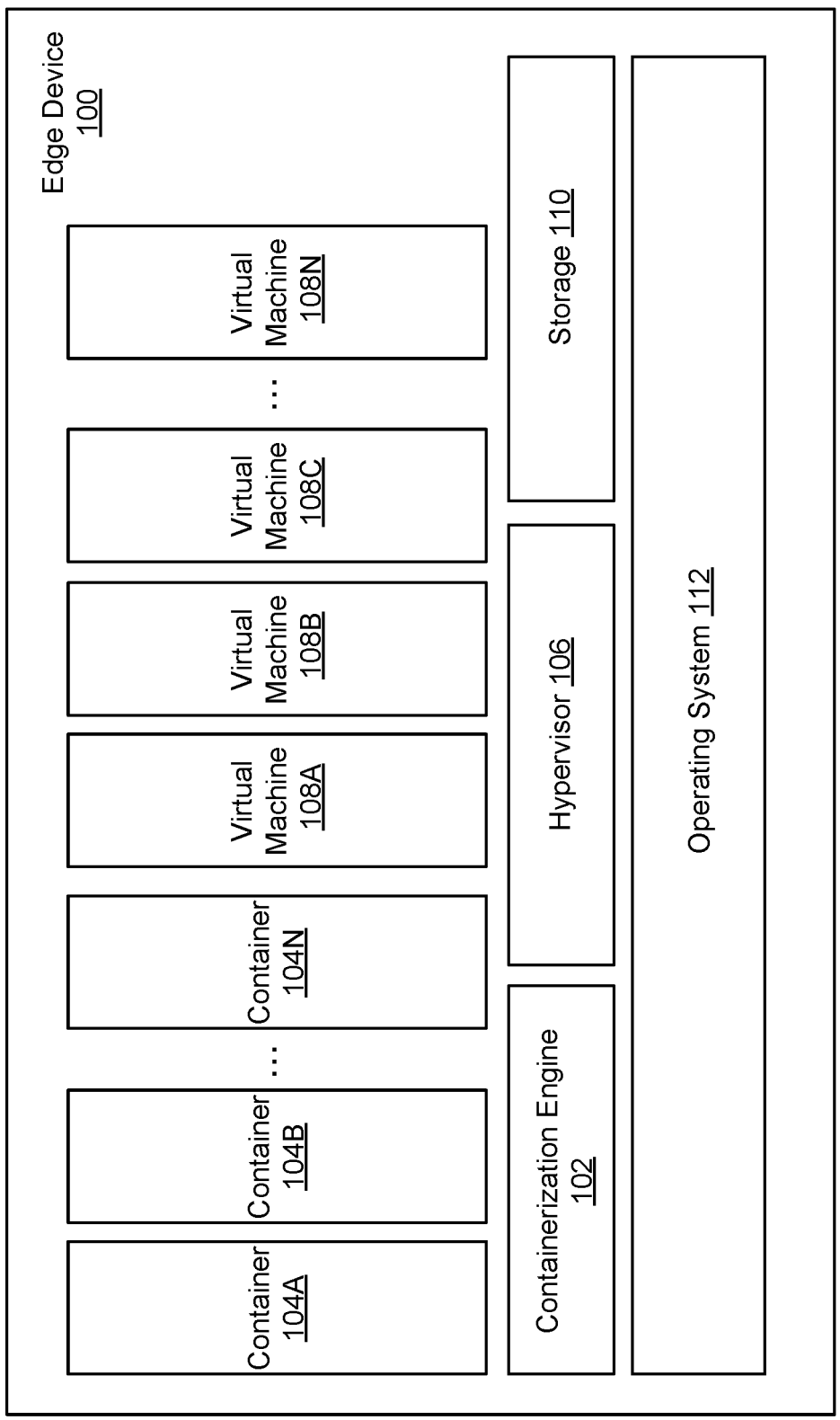
FIG. 1 is a block diagram of an example high-level architecture for a cloud infrastructure edge computing device, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

In some examples, a cloud-integrated edge service (e.g., implemented in an edge computing device, also referred to as "an edge device," for brevity) may be integral in addressing the desire to run time-sensitive cloud infrastructure application outside of a centralized data center (e.g., a datacenter of a cloud infrastructure service provider). Such an edge computing device may deliver computing and storage at the edge and/or in disconnected locations (e.g., remote locations separate from the centralized data center and lacking a public/private network connection (e.g., an Internet connection, a VPN connection, a dedicated connection, etc.) to enable low-latency processing at or near the point of data generation and ingestion. In some instances, a fleet of portable (which may be ruggedized for protection) server nodes (e.g., a fleet of edge devices) may be configured to physically bring the cloud infrastructure service to remote locations where cloud technology has been considered technologically infeasible or too costly to implement.

To a customer (e.g., a user), the edge computing device can act as an extension of their cloud infrastructure: including virtual machines (VMs), containers, functions and data files, block volumes or object store services can also be delivered from the cloud infrastructure tenancy (e.g., a tenancy of the centralized cloud computing environment) with little to no modifications, and the customer experience may remain unchanged from that of the centralized cloud computing experience. Additionally, the edge computing device may be configured to implement both a control plane and a data plane that are part of a cloud infrastructure service provider. The data plane can be configured to manage data storage, migration, processing, etc., while the control plan can be configured for controlling the various services and architecture components of the computing device. Once the edge computing device is properly connected to a customer computing device (e.g., via a local area network (LAN)), the customer may be able to utilize the IaaS service (or at least a subset of it) using the same SDK and API used with the centralized cloud service.

The edge computing device can be delivered to a customer in a pre-configured form, such that the only action that might be required of the customer is to connect the nodes to a network (e.g., a local/on premise network that is accessible by a user computing device), power them up, and/or log in. The device can be pre-configured in various ways based on customer preference/request, or it can be in one of various configurations (e.g., storage-centric, compute-centric, etc.). The node or cluster of nodes can be portable and is intended to be mobile-when moved and set up again (or used while in motion), the deployment continues to run from where it turned off (or continuously). The edge computing device can also monitor for wide area network (WAN) connection availability (e.g., the Internet or the like), and can synchronize customer and management data with the cloud once connected to a WAN.

Some potential use cases for the edge computing device include storage and processing, compute and input/output (I/O) intensive applications, machine learning, remote computing, low latency database and analytics, and data collection and migration. More specifically, the edge device can be used for storage and processing of large volumes of images, video, audio, and IoT sensor data generated in environments where WAN connection is latent or unavailable (e.g., in remote areas, an oil offshore platform, or the like). Once this data is pre-processed, filtered, compressed, and/or secured it may be transported or transferred to the cloud service provider, where it can be further processed by the centralized server (e.g., traditional cloud service provider). The device can also be used for compute and I/O intensive applications, where low latency is paramount, such as tactical reconnaissance or 5G communications. The device can also be used for machine learning, with models trained in the cloud and running in disconnected locations to improve efficiency, intelligence, and/or productivity in manufacturing, document management, transportation, oil and gas mining, and/or telecommunications. It can also be used for remote computing requiring elevated security and airtight containment of data. Additionally, the device can be used for low latency database and analytics workloads, with more applications optimized over time. Further, the device can also be used for data collection and migration of large sets of object and database management system (DBMS) data into a cloud service provider, e.g., at faster speeds and lower cost than a WAN transfer.

The edge device can natively support distributed cloud paradigms, where complex, multi-stage compute workflows can be separated into individual components, which in turn can be deployed to the infrastructure of the edge device, on premise, and/or in the cloud. An example of such distributed workflow is represented in the following scenario. Massive amounts of data can be collected by an edge computing node deployed on an airplane (e.g., a military jet) in a reconnaissance operation with no Internet access (e.g., a disconnected edge computing device), where this data is be pre-processed in near real time by a machine learning model previously trained by the cloud service provider that provided the edge device. Even the first pass of processing the data with the models can detect significant anomalies and can alert personnel immediately—for example, a bridge may be destroyed and therefore the troops should be rerouted. When the airplane lands, the edge computing device can be physically connected to a network (e.g., an edge station potentially deployed at the airstrip). The pre-processed, filtered, smaller dataset can be loaded for final processing to a cluster of edge computing device nodes at the edge station. The original edge computing device can be released and can be loaded on another (or the same) airplane, for example to support the next mission. When processing at the edge station is complete, a 3D map update can be issued for immediate use. Change sets can then be uploaded by the edge station cluster to a datacenter and can be used to build future models providing intelligent tactical forecasts to the reconnaissance operation, or the like.

It should be appreciated that the following techniques may be employed in a variety of contexts such as telecommunications, oil and gas, healthcare, hospitality, agriculture, transportation, and logistics, and the like.

Embodiments described herein address these and other problems, individually and collectively. Specifically, embodiments of the present disclosure provide for a cloud infrastructure edge computing device.

Edge Device Architecture

An edge computing device (sometimes referred to as "a cloud-computing edge device," a "cloud infrastructure edge computing device," or an "edge device," for brevity), extends a user's centralized cloud computing tenancy by physically putting customer infrastructure and platform services where data is generated-on the edge, on premise, or completely disconnected. Each deployment is created to address specific customer needs by provisioning VM instance images and data from the customer's centralized cloud tenancy. These workloads remain fully functional offline as the edge device adapts to the connection state, operates in harsh environmental conditions, and is ready to sync with the cloud whenever the connection is re-established.

FIG. 1 is a block diagram of an example high-level architecture for a cloud infrastructure edge computing device (e.g., edge device 100), according to at least one embodiment. An overview of the software and hardware component of the edge device 100 is provided below.

In some examples, the edge device 100 may include containerization engine 102 (e.g., Docker, Kubernetes, etc.) configured to implement one or more containers (e.g., corresponding to container(s) 104A, 104B, 104C, to 104N, collectively referred to as "container(s) 104"). A containerization engine (e.g., the containerization engine 102) may be container-orchestration system for automating computer application deployment, scaling, and management. In some embodiments, the containerization engine 102 may be configured to provide OS-level virtualization to deliver software in packages called containers. These containers can be isolated from one another and utilize respective software, libraries, and configuration files, and can communicate with each other through well-defined channels. In some embodiments, service(s) 104 may include any suitable number of services (e.g., one or more). These services may implement at least some portion of centralized cloud capabilities. Each service may be stand-alone or operate as a distributed cluster. The edge device 100 may further include a hypervisor 106 configured to implement one or more virtual machines (e.g., virtual machines 108A, 108B, 108C, to 108N, collectively referred to as "virtual machine(s) 108" or "VMs 108").

In some examples, the edge device 100 includes storage 110 (e.g., object and/or block storage for storing local data). The edge device 100 includes operating system (OS) 112. In some embodiments, the OS 112 may be optimized for executing on an edge device and/or specific to execution on an edge device. OS 112 may be configured to manage the hardware of edge device 100 and supports a data plane of the services running on the edge device 100. The OS 112 may be configured to support a specific deployment type (e.g., a single edge device deployment, or a specific edge device cluster configuration). The OS 112 may be configured to secure the edge device by disallowing or otherwise blocking direct access by customers.

In some embodiments, the edge device 100 may include hardware such as any suitable number of central processing units (CPUs) and/or storage drives. For example, the edge device 100 depicted in FIG. 1 may have one, two, or more CPUs, with various numbers of cores per processing unit, and it may include any number of storage drives (e.g., 6.4 terabyte (TB) drives, or the like). As a non-limiting example, the edge device 100 may include block and/or object storage of any suitable size. The edge device 100 may include any suitable number of central processing units (CPUs), graphics processing units (GPUs), random access memory (RAM) of any suitable size, one or more ports (e.g., QSFP28, RJ45, dual ports, etc.), tamper-evident seals, or any suitable combination of the above components.

In some examples, the basic system functionality/services can be accessed via RESTful APIs have a custom load of software based on Linux. The virtual machine(s) 108 may individually be a Kernel-based Virtual Machines (KVM) (e.g., a virtual machine managed by a virtualization module in the Linux kernel that allows the kernel to function as a hypervisor) and/or a hardware-based Virtual Machine (e.g., a virtual machine managed by a virtualizer, such as Quick EMUlator (QEMU), that can perform hardware virtualization to enable virtual machines to emulate of number of hardware architectures). Although storage 110 is represented as a separate component from the service(s) 104 and VM(s) 108, it can run as a container (e.g., container 104A) or in a VM (e.g., VM 108A). In some examples, it may be favorable to implement the storage 110 (e.g., object storage, block storage, etc.) as a container.

Figure 2:
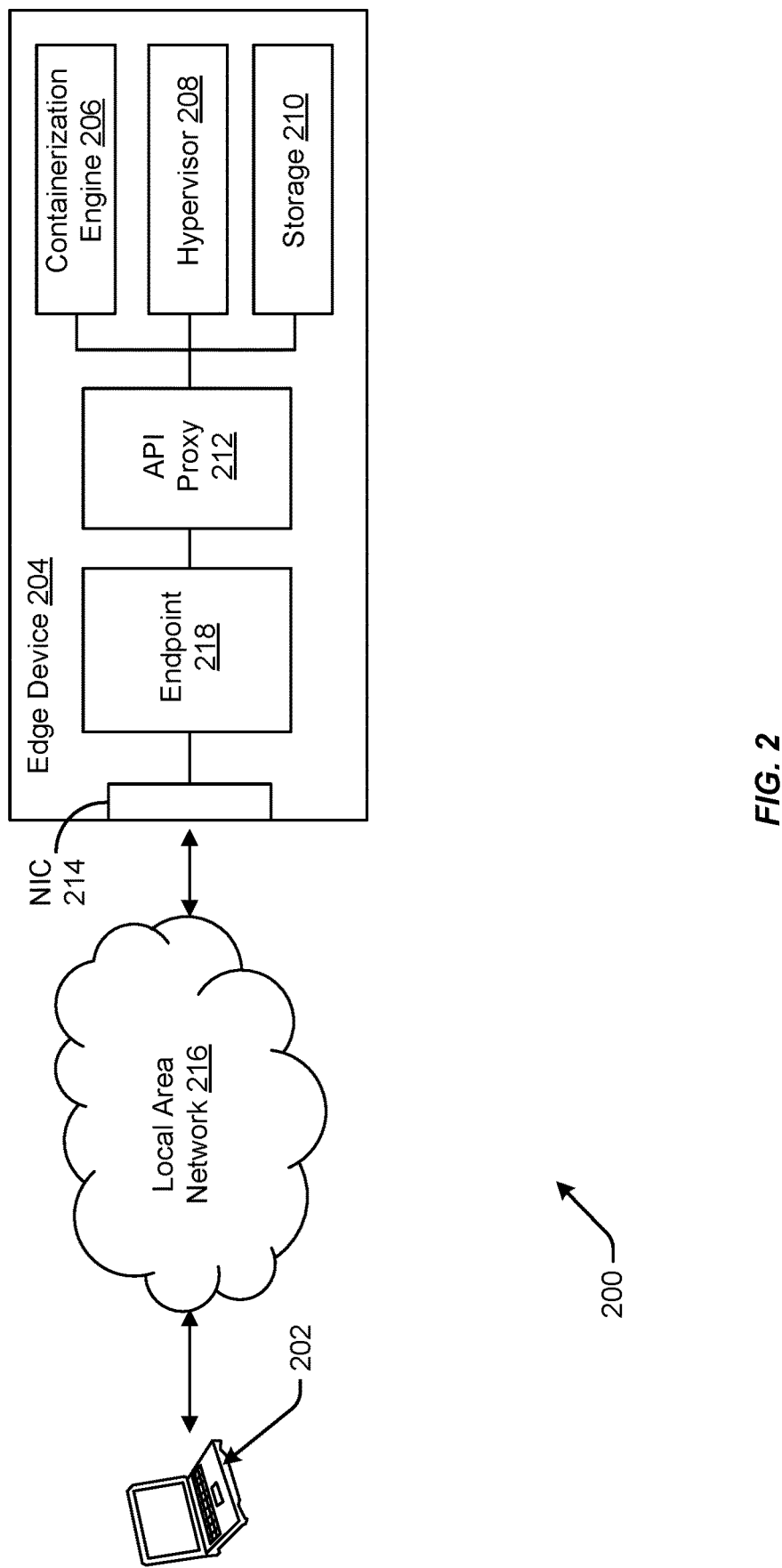
FIG. 2 is a block diagram of an example architecture for connecting a user computing device to a cloud infrastructure edge computing device, according to at least one embodiment.

FIG. 2 depicts an example architecture 200 for connecting the edge device described herein (e.g., edge device 100 from FIG. 1) to a computing device 202 (e.g., a user computing device). The computing device 202 can be any type of computing device including, but not limited to, a laptop computer, a desktop computer, or the like. The edge device 204 (an example of the edge device 100 of FIG. 1) may include containerization engine 206 (an example of the containerization engine 102 of FIG. 1), hypervisor 208 (an example of the hypervisor 106 of 1), and storage 210 (an example of the storage 110 of 1).

Additionally, as mentioned briefly above, the edge device 100 may include an API proxy 212 for managing the RESTful API calls received from the computing device 202. The API calls may enter the edge device 204 via network interface card (NIC) 214 that is internal to the edge device 204. The NIC 214 may be used to connect the edge device 204 to the computing device 202 via a local area network (e.g., the LAN 216). The API calls received by the NIC 214 may be transmitted to an exposed endpoint that may implement a Web server (e.g., endpoint 218). The web server can transmit the requests to the API proxy 212, which can route the requests to the appropriate service (e.g., containerization engine 206, hypervisor 208, and/or storage 210). The exposed endpoint/web server may also be configured to implement the lightweight console that is for use by the customer (e.g., the user interface displayed on the computing device 202).

The lightweight console can run within a web browser (e.g., Mozilla Firefox, or the like) on a laptop computer, desktop computer, or other network-accessible device (e.g., connected to the local area network (LAN 216)) that is network-connected to the edge device 204 (e.g., via a router, cable, etc.). The edge device 204 can expose the endpoint 218 for the console connection, and the web server can transmit data to the web browser of the computing device 202 over the LAN 216.

Figure 3:
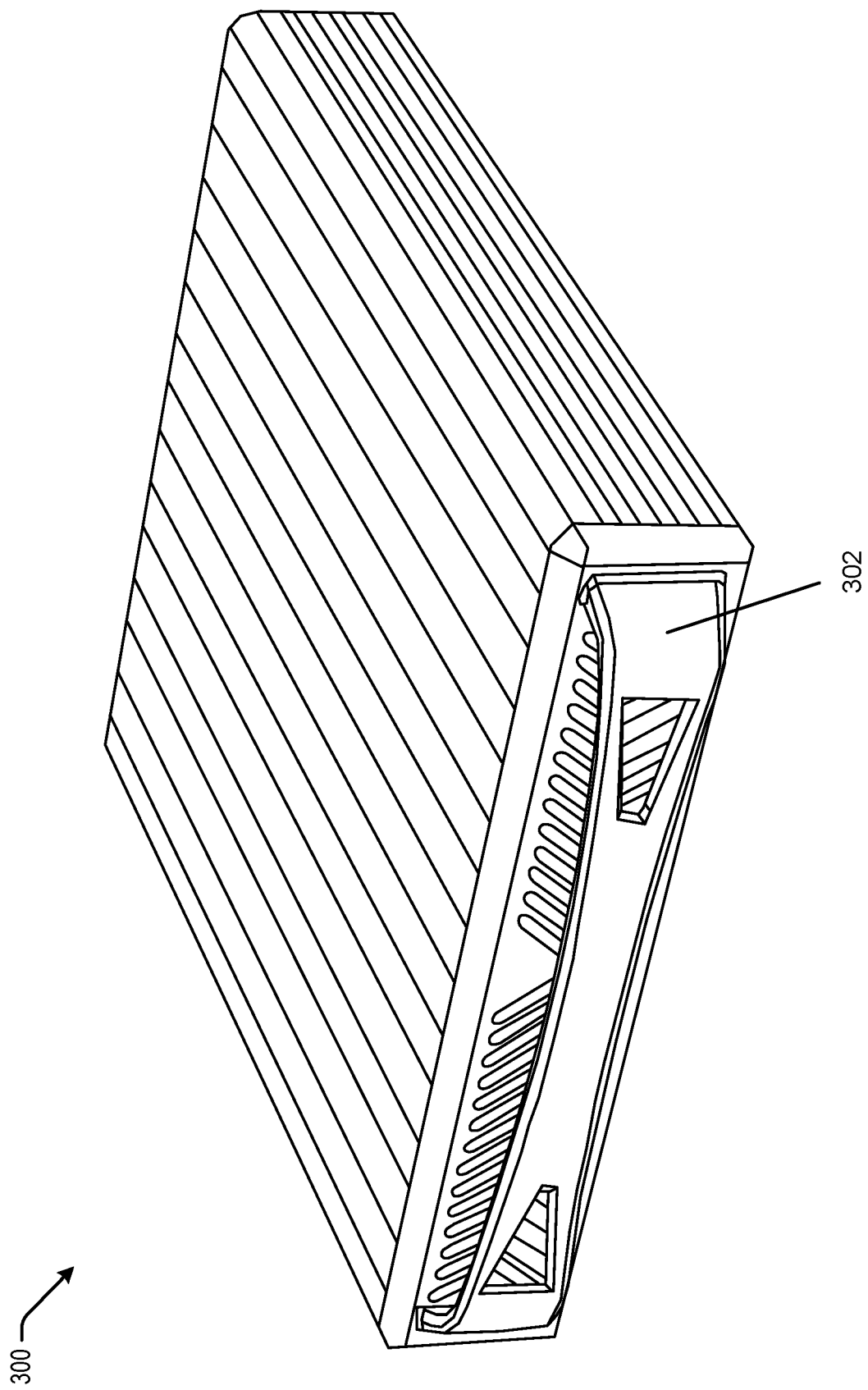
FIG. 3 is a block diagram of an example enclosure for a cloud infrastructure edge computing device, according to at least one embodiment.

FIG. 3 illustrates an example physical enclosure 300 of the edge device described herein (e.g., edge device 100 from FIG. 1). Various form factors, shapes, colors, etc., can be employed to build a box (e.g., ruggedized) that can house the edge computing device. The physical enclosure can include handle 302, as shown, and may include tamper evident elements, so that if anyone breaks the enclosure open, it will be evident. In this way, the service provider that provides the edge computing device can ensure that the device is not modified. In some examples, the physical enclosure 300 may not be possible to open. However, in some cases, it might be possible, but it would require extreme measures.

Figure 4:
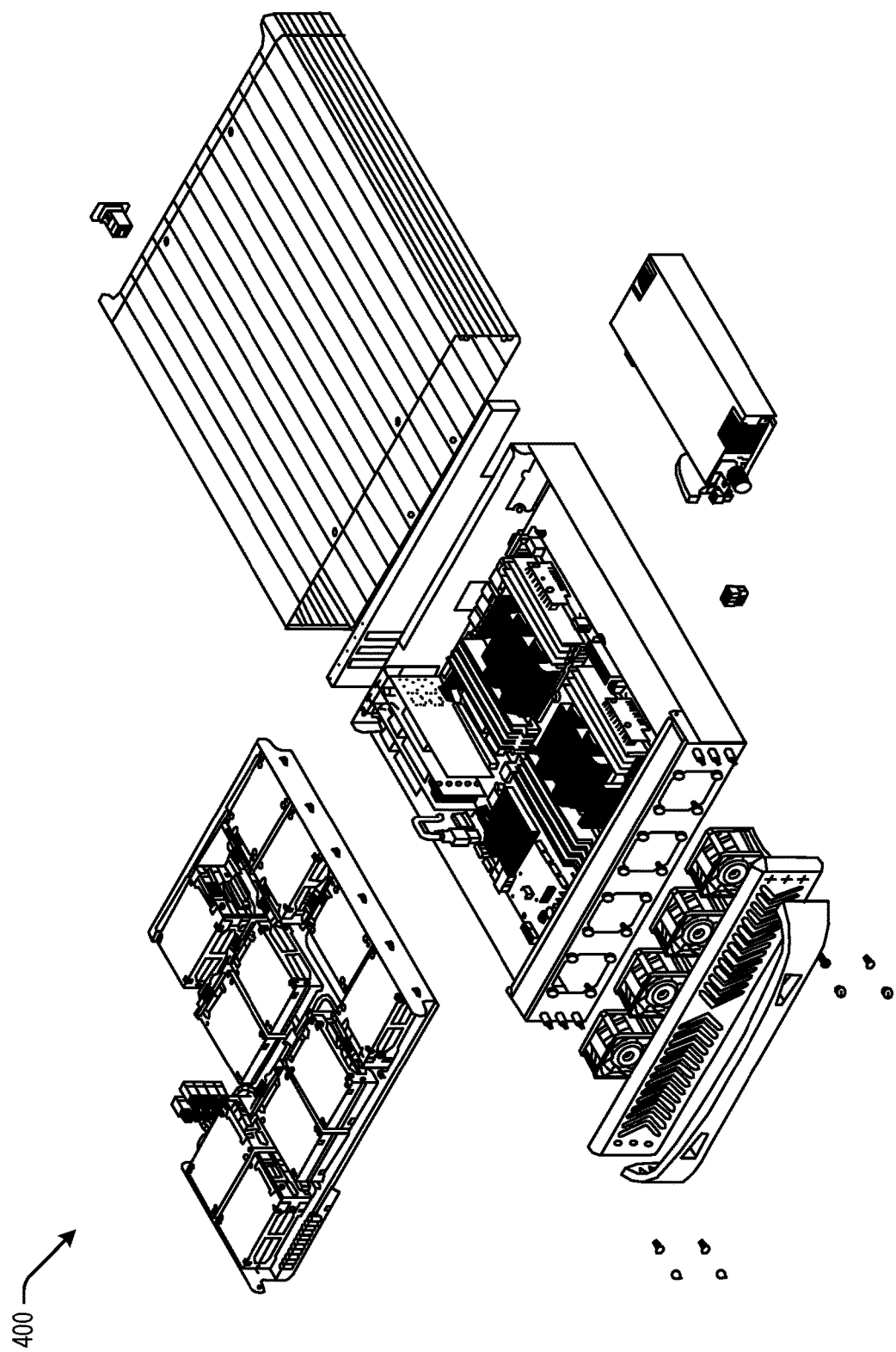
FIG. 4 illustrates an exploded view of the cloud infrastructure edge computing device described herein, in accordance with at least one embodiment.

FIG. 4 illustrates an exploded view of the cloud infrastructure edge computing device described herein (e.g., edge device 400, an example of the edge device 100 of FIG. 1), in accordance with at least one embodiment. The various components described with respect to FIGS. 1 and 2 can be communicatively attached to one or more motherboards and/or interface cards within the edge device 400. The illustrated configuration of components is but just one implementation. The specific locations of components shown is not intended to be limiting, and as noted, any configuration that can implement the functionality described herein is acceptable. Once the components are installed, the entire box can be closed, sealed, and locked with tamper-evident components.

The edge device 400 is a single enclosure. The enclosure may be designed to house any suitable number of serially attached SCSI (SAS) solid-state drives (SSDs) and all other components (e.g., CPU, memory, GPU, etc.) within the enclosure. The system may include one or more (e.g., 12 Gb) SAS connections to each drive in a fully contained sheet metal enclosure designed to fit within a standard 19" rack resting on an L bracket/shelf, on a tabletop or upright next to a desk with the use of a floor stand.

The system may include a tamper evident enclosure, front security plugs covering screws holding a front bezel in place with rear security interlock features. In some embodiments, the system may include a dual socket motherboard and any suitable amount of DRAM. In some embodiments, the system may include any suitable number (e.g., 2, 3, etc.) SATA SSDs, storage controllers, embedded network connections, one or more ports (e.g., dual ports, serial ports, etc.), one or more fans as part of a cooling system, or any suitable combination of the above.

As a non-limiting example, the edge device 400 may be made up of an external extruded aluminum case secured in the front with a vented bezel and rear panel only exposing I/O connections required for data transfer and management. Mounting can be designed to mount the any suitable motherboard, fans, and power supply.

Figure 5:
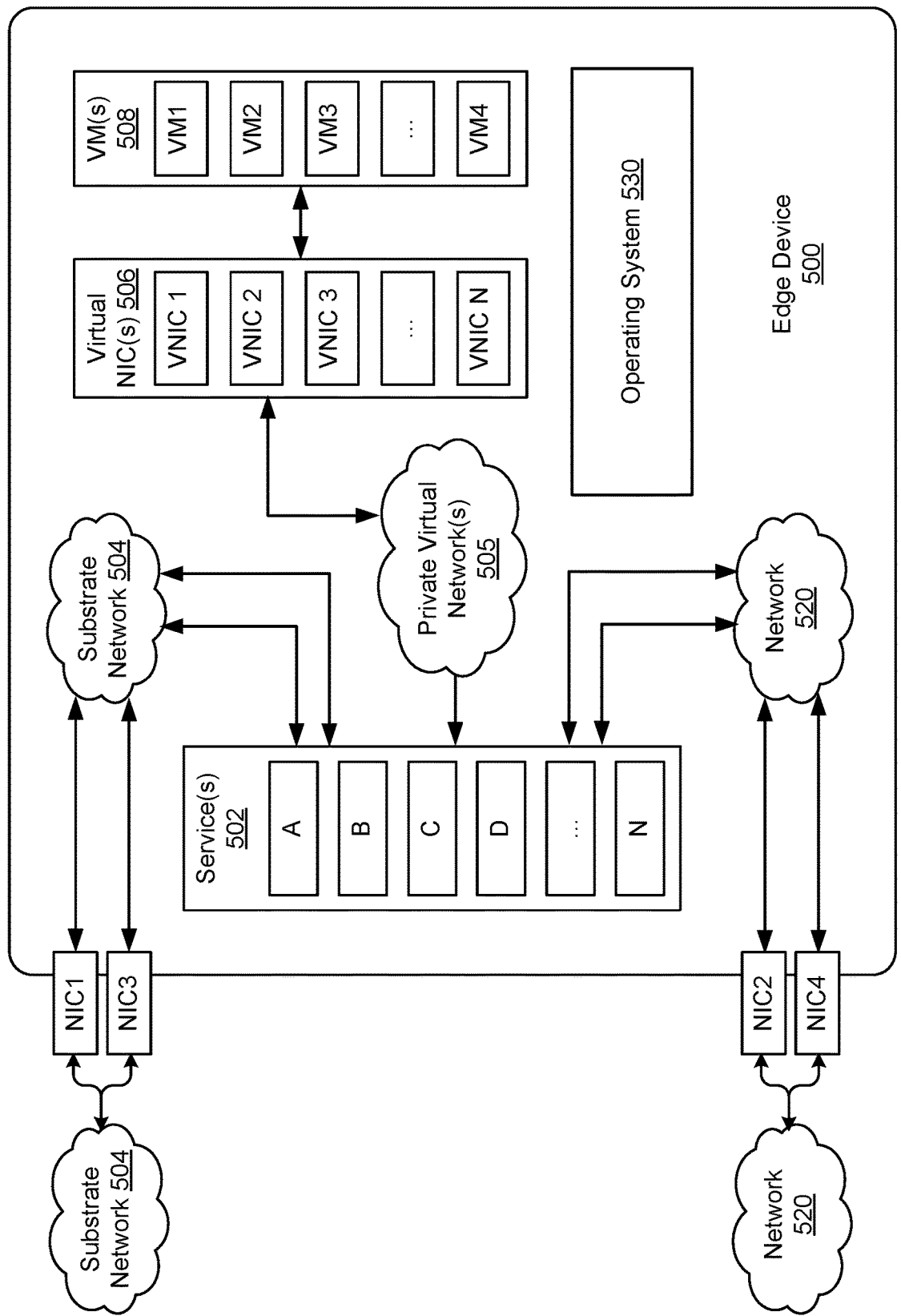
FIG. 5 is a block diagram of an example computer architecture of a cloud infrastructure edge computing device, according to at least one embodiment.

FIG. 5 is a block diagram of an example computer architecture of a cloud infrastructure edge computing device (e.g., edge device 500, an example of the edge devices 100 and 204 of FIGS. 1 and 2, respectively), according to at least one embodiment. The edge device 500 can be thought of as a cloud-integrated service that extends some or all conventional cloud capabilities to locations that may not be accessible by or have access to cloud data centers. This can be achieved via portable ruggedized server nodes that provide cloud-like functionality in locations with no WAN connectivity. This allows customers to shift select cloud workloads to remote locations and enable intensive data processing operations close to the data ingestion points at the edge of their cloud infrastructure. In some embodiments, edge device 500 may be associated with a tenancy and/or compartment.

The edge device 500 may include any suitable number of services (e.g., service(s) 502). Each service may run as a container (e.g., a Docker container) locally on the edge device 500. The service(s) 502 may be communicatively connected via a substrate network 504 such that the communications between services are encrypted (e.g., in accordance with a security protocol such as MACsec). Each container may be assigned a substrate IP address (e.g., a static address) with which traffic can be addressed. In some embodiments, a security protocol (e.g., MACsec) is configured at provisioning time (e.g., before the edge device 500 is shipped to the user). The edge device's system software (including service(s) 502) may execute in the secure environments protected by boot security software (e.g., Trenchboot Secure Launch). Users may be restricted from accessing the secure environment and/or the substrate network 504. To minimize the number of resources used by these services, the service code may be compiled and saved to disk to decrease RAM space as well as decrease the CPU load on the edge device 500.

Some example services included in service(s) 502 may include a UI console service, an identity control plane (CP) service, an identity data plane (DP) service, a computer application programming interface (API) service, a compute worker thread service, a virtual network (VN) API service, a block storage API service, a function-as-a-service service, an events service, an object storage management service (e.g., implementing a storage platform such as Ceph Storage or the like), a compute DP service (e.g., an example of hypervisor 208 of FIG. 2), a VN DP service, a block storage management service, a function-as-a-service API service, a function-as-a-service load balancing (LB) service, a function-as-a-service process thread service, a distributed data store management service (e.g., etcd3), a dynamic host configuration protocol service, a domain name system service, a network time protocol (NTP) service, to name a few. Some example functionality provided by these services is discussed below.

By way of example, compute DP service may be configured (e.g., preconfigured and provisioned onto the edge device 500) to isolate the VM(s) 508 on the same hypervisor host. The compute DP service can utilize any suitable container engine (e.g., Docker container, MicroContainer, or the like) to isolate the VM(s) 508 on the same hypervisor host from each other. The compute DP service may utilize any suitable hypervisor (e.g., Quick EMUlator (QEMU), Kernel-based Virtual Machine (KVM), etc.) to provide virtual hardware emulation for VM(s) 508. In some embodiments, VNIC(s) 506 are attached to subnets of any suitable number of virtual networks (e.g., private virtual network(s) (PVN(s))) 505 and are assigned private Internet Protocol (IP) addresses. One VM may have multiple VNICs from different VCNs and different subnets. The maximum number of VNICs can be limited by predefined thresholds (e.g., configuration data referred to as "VM shape" that defines VNICs per VM count, VNIC shape, etc.). In some embodiments, the predefined thresholds are applied to each of the VM(s) 508. The subnets utilized by the VNIC(s) 506 may be isolated by VLANs. In some embodiments, some or all the VNIC(s) 506 may be assigned public and/or private IP addresses. A public IP address is an address in the network 520, while a private IP address refers to an IP address of the PVN(s) 505.

In some embodiments, the edge device 500 implements various networking functionality via a number of services such as a network address translation (NAT) service, a dynamic host configuration protocol (DHCP) service, a domain name system (DNS) service, a network time protocol (NTP) service, a metadata service, and a public API service). The metadata service may provide initialization data and other metadata to all VM(s) 508. In some embodiments, DHCP service assigns private IP addresses to each of the VNIC(s) 506, each of the VM(s) 508 having one or more VNICS. DNS service may provide domain name resolution to VM(s) 508 on the edge device 500. NTP may provide time synchronization to VM(s) 508. In some embodiments, a public IP service executing as part of service(s) 502 may enable a VM to access a public API without assigning the VM a public IP and without configuring a service gateway.

In some embodiments, at least one of the VM(s) 508 may implement block (or object) storage. In some embodiments, the hypervisor associated with a virtual machine may include a library that enables the hypervisor to use a distributed data storage platform (e.g., Ceph). The library may utilize a protocol associated with that storage platform (e.g., RADOS Block Device (RBD) to facilitate storage of block-based data. The distributed data storage platform may be implemented over multiple virtual machines. In some embodiments, the distributed data storage platform supports making snap shots and copying block volumes. VM images and VM block volumes can be Ceph block devices. In some embodiments, the VM(s) implementing the distributed data storage platform will use system-reserved resources (e.g., eight CPU cores, or any subset of the total number of CPUs available on the edge device 500). For example, to provision a boot volume, a block device image may be copied to a boot volume of the block device. The distributed data storage platform may use block devices that include multiple nodes for redundancy. If some node fails, then the block device can continue to operate. In some embodiments, the distributed data storage platform (e.g., Ceph or the like), automatically recovers the block device data in case of a few node failures. Block storage may be utilized to store images for any suitable deployable resource. By way of example, an image may be utilized for launching VMs. In some embodiments, the image may correspond to a particular VM shape (e.g., a compute heavy VM, a GPU optimized VM, a storage VM, and the like).

Compute API service may support the following operations: 1) VM launch and terminate, 2) VM stop, start, reboot, 3) List VMs and/or get information on a specific VM, 4) obtain VM console history API, 5) obtain a VM snapshot, 6) attach/detach block volumes, and the like. In some embodiments, Compute API service can be used to call other services (e.g., compute DP service, identity DP service for authentication and authorization, etc.).

Some of the functionality of other services will be discussed in connection with FIG. 7. In general, although each service may not be discussed in detail herein, the general functionality provided by the service(s) 502 may include the functionality of cloud services provided by a remote cloud service provider. In some embodiments, the edge device 500 may be associated with a predefined region and/or realm such that some of the service(s) 502 may operate as if they were operating in a cloud computing environment, despite the fact they are operating on one or more local device(s) (one or more edge devices) as a single instance or as part of a distributed service that may have no or intermittent public network access to a cloud computing environment associated with the customer. A "region" refers to a geographic location at which a service center resides. A "realm" refers to a logical collection of regions. Realms may be isolated from each other and do not share data.

In some embodiments, the edge device 500 may provide any suitable number of virtual networks (e.g., PVN(s) 505) using compute, memory, and networking resources (e.g., virtual network interface card(s) (VNIC(s) 506)). A virtual network is a logical network that runs on top of a physical substrate network. Using the service(s) 502, one or more customer resources or workloads, such as virtual machines (e.g., virtual machine(s) (VM(s)) 508, executing a compute instance) can be deployed on these private virtual networks. Any suitable combination of VM(s) 508 can execute functionality (e.g., a compute instance, storage, etc.) which is individually accessible through a virtual NIC (e.g., one of the virtual NIC(s) 506). Each VM that is part of a PVN is associated with a VNIC that enables the VM (e.g., a compute instance) to become a member of a subnet of the PVN. The VNIC associated with a VM facilitates the communication of packets or frames to and from the VM. A VNIC can be associated with a VM when the VM is created. PVN(s) 505 can take on many forms, including peer-to-peer networks, IP networks, and others. In some embodiments, substrate network traffic of the service(s) 502 may be encrypted and/or isolated (e.g., by virtue of different PVNs or subnets) from network traffic of one or more the VM(s) 508 executing on the edge device 500.

The edge device 500 thus provides infrastructure and a set of complementary services that enable customers to build and run a wide range of applications (e.g., compute instances), services, and/or storage in a highly available, physically local, and virtual hosted environment. The customer does not manage or control the underlying physical resources provided by the edge device 500 but has control over expanding or reducing virtual machines (e.g., compute instances, virtual NICs, block or object storage, etc.), deploying applications to those virtual machines, and the like. All workloads on the edge device 500 may be split into different CPU sets (e.g., VM and non-VM). One set (e.g., non-VM such as workloads performed by the service(s) 502) may utilize a subset of CPU cores (e.g., 8) of the edge device 500, while the other set (e.g., VM workloads performed by the VM(s) 508) may utilize a different subset of CPU cores.

The edge device 500 may be communicatively connected to a user device (e.g., the computing device 202 of FIG. 2) via one or more network interfaces (e.g., NIC2 and/or NIC 4) and network 520 to interact and/or manage the VM(s) 508. In certain embodiments, a lightweight console can be provided at the user device via a web-based user interface that can be used to access and manage the edge device 500. In some implementations, the console is a web-based application (e.g., one of the service(s) 502) provided by the edge device 500.

FIG. 5 depicts a single edge device. However, it should be appreciated that more than one edge device may be utilized as a distributed computing cluster.

Figure 6:
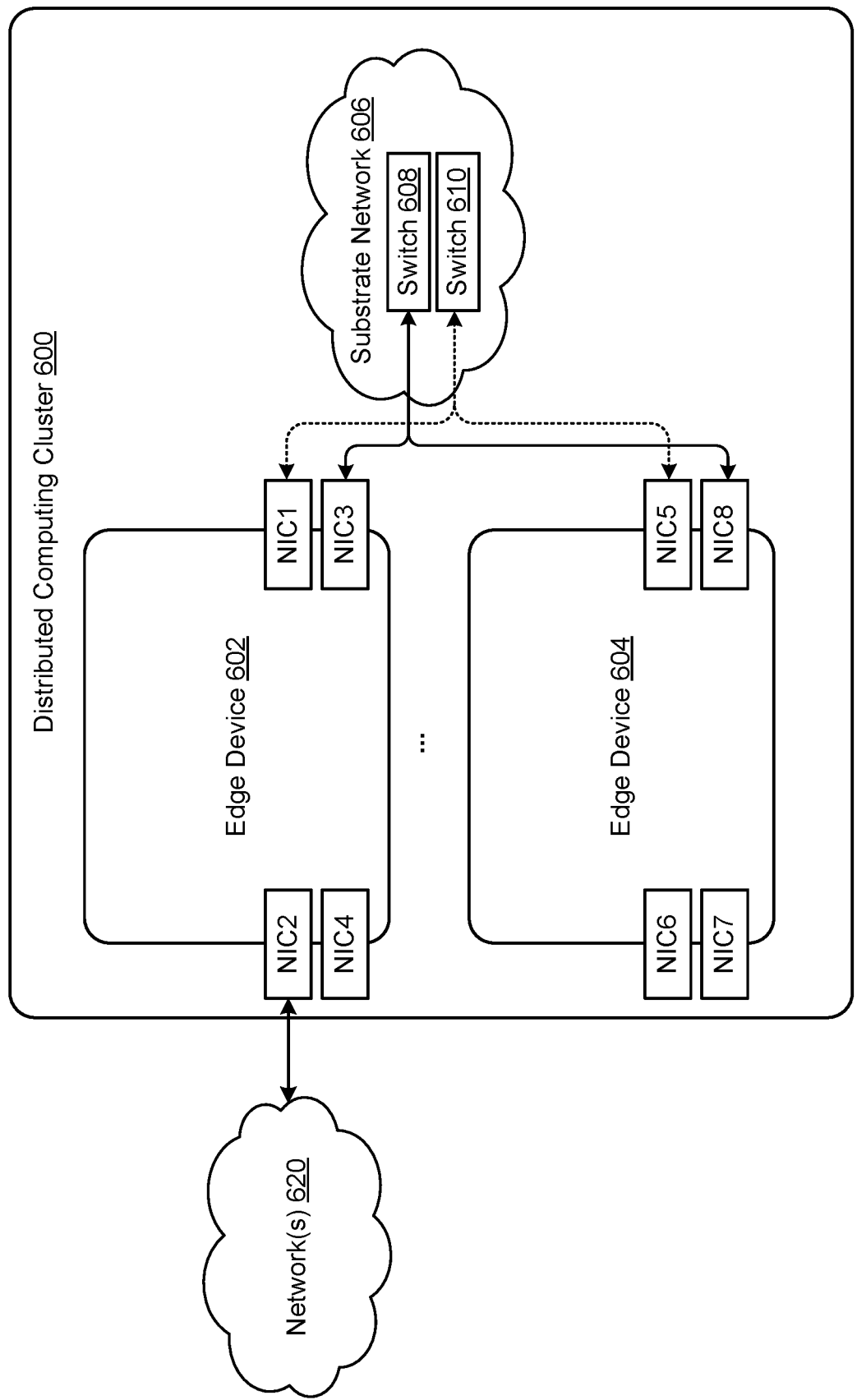
FIG. 6 is a block diagram depicting a distributed computing cluster that includes one or more edge computing devices, according to at least one embodiment.

FIG. 6 is a block diagram depicting a distributed computing cluster 600 that includes one or more edge computing devices (e.g., edge device 602 and 604, each an example of the edge device 500 of FIG. 5), according to at least one embodiment. In some embodiments, the edge devices 602 and 604 may be associated with the same tenancy and/or compartment.

Each edge device of the distributed computing cluster 600 may be connected via substrate network 606 (an example of the substrate network 504 of FIG. 5. In some embodiments, the edge devices of the distributed computing cluster 600 (sometimes referred to as "edge computing nodes" or "edge nodes") may be connected by the substrate network 606 using one or more switches (e.g., switch 608 and/or 610). In some embodiments, NIC1 and NIC5 may include a particular connector (e.g., RJ45 connector) while NIC3 and NIC8 may include the same or a different connector (e.g., a QSFP28 100 GbE connector). In some embodiments, only one edge device of the distributed computing cluster 600 is connected to a customer network such as network(s) 620 (an example of the network 520 of FIG. 5). Thus, not only may traffic between services of an edge device be encrypted and isolated from other traffic of a given edge device, but traffic between distributed services operating across multiple edge devices may also be encrypted and isolated from other traffic of the computing cluster. In some embodiments, each edge device is preconfigured as a particular node in the distributed computing cluster 600. In other embodiments, the user can configure the number and topology of the edge devices of the distributed computing cluster 600.

Figure 7:
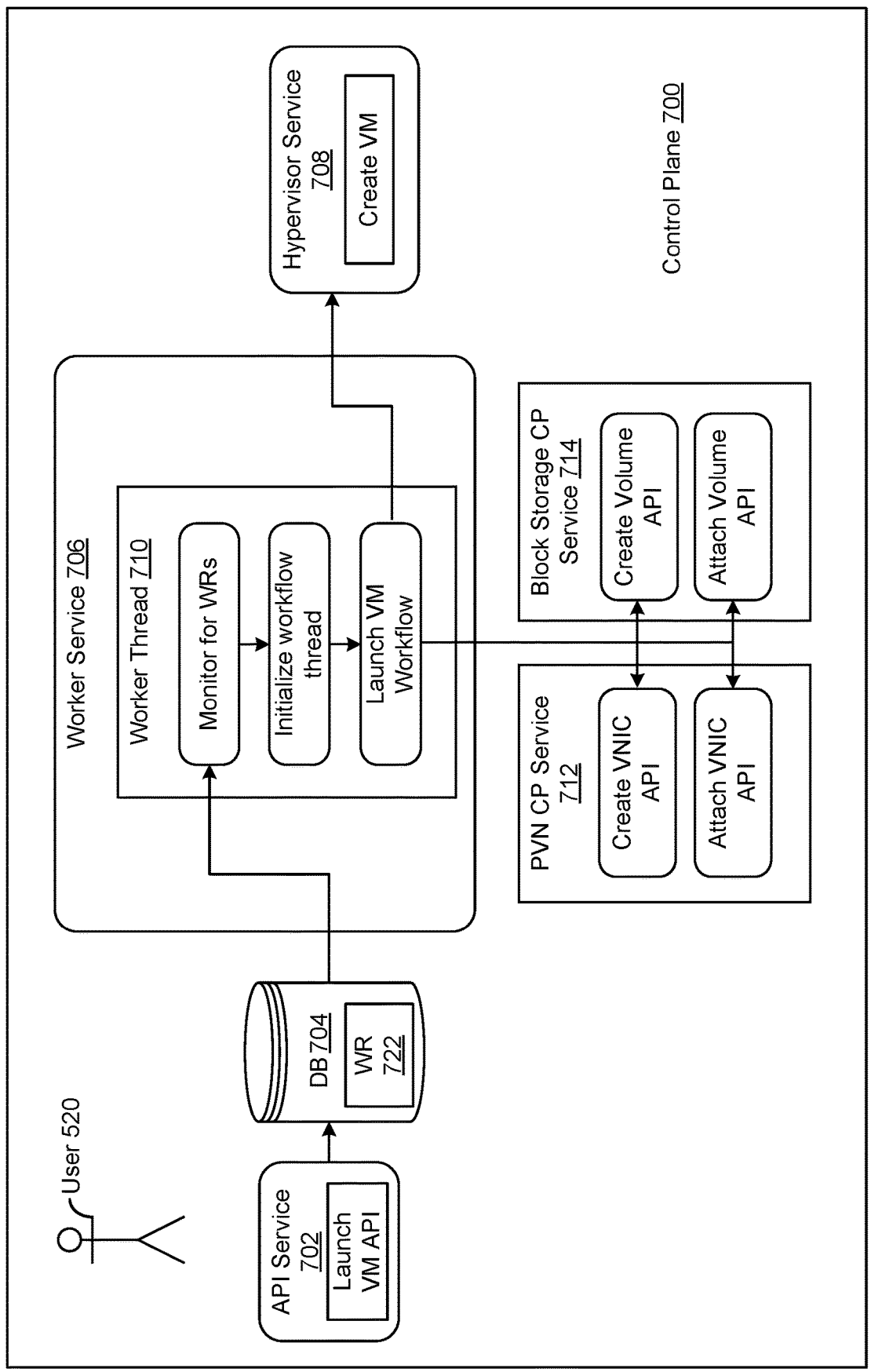
FIG. 7 is a block diagram depicting a control plane and flow for executing a workflow by one or more components of a cloud infrastructure edge computing device, according to at least one embodiment.

FIG. 7 is a block diagram depicting a flow 700 for executing a workflow by one or more components of a cloud infrastructure edge computing device, according to at least one embodiment. Components that execute the flow 700 may include API service 702, database (DB) 704, worker service 706, hypervisor service 708, PVN CP service, Block storage CP service 714, although more or fewer services may be included. In some embodiments, each of the services of FIG. 7 are an example of a service of the service(s) 502 of FIG. 5. In some embodiments, at least some of the functionality discussed in connection with the services of FIG. 7 may be combined in any suitable combination and provided as a single service or instances of the same service. By way of example, in some embodiments, the functionality of services 702-708 may be provided by a single service (e.g., compute CP service discussed above in connection with FIG. 5). In some embodiments, the functionality provided by the services 702-708 may be provided by a single edge device (e.g., edge device 500 of FIG. 5) or by two or more edge devices (e.g., by edge device 602 and edge device 604 of FIG. 6).

In some embodiments, the API service 702 may be configured to accept work requests that include intended state data that describes an intended state of a set of data plane resources (e.g., VM(s) 508 of FIG. 5). As a non-limiting example, user 720 may utilize a user device (e.g., the user device *202 of FIG. *2) to access a user interface with which he can make various selections indicating a desire to launch a VM. The user input may be received by the API service 702 (an example of the compute CP service of FIG. 5) which may generate a work request (WR) (e.g., WR 722) and utilize a predefined Launch VM API to store the work request in a distributed database (e.g., DB 704). In some embodiments, the DB 704 may be a computing cluster, which is configured to use etcd3 as an immediately consistent, highly available, transactional, distributed database. A work request indicates a desire and information needed to create and/or modify data plane resources such as VM(s) 508. In some embodiments, the work request includes state information indicating a desired state for the data plane resource. In some embodiments, the DB 704 may be accessible to all services operating on any edge device (and by services operating on any suitable edge device of an edge device cluster such as distributed computing cluster 600).

Worker service 706 (e.g., an example of the compute CP service of FIG. 5) may be configured to execute one or more worker processes (e.g., one or more computing threads, such as computing thread 710). Some of these worker processes may be configured by the worker service 706 at any suitable time to execute a continuous and/or ongoing predefined workflow. By way of example, the worker service 706 may configure one or more worker threads (e.g., including computing thread 710) to monitor the DB 704 for new work requests (e.g., WR 722). The computing thread may be configured to determine if a work request WR 722 is already being attended to. In some embodiments, this entails checking a predefined storage bucket within DB 704 for a unique identifier associated with WR 722. If the unique ID included within WR 722 does not appear in the bucket (or the WR is otherwise indicated as having not been picked up for processing), the computing thread 710 (e.g., a nanny thread) may initialize a workflow thread (e.g., another instance of a computing thread 710) which may then be configured by the computing thread 710 to execute a workflow corresponding to launching a VM corresponding to the WR 722.

The initialized workflow thread may be communicatively coupled (e.g., via the substrate network 504 of FIG. 5) to a workflow service (not depicted). The workflow service may be configured to identify, from one or more predefined workflows, a predefined workflow that corresponds to launching a VM, and therefore, to the WR 722. These predefined workflows identify one or more steps/operations to be taken, and a sequence to those steps, to achieve a predefined goal (e.g., launching a virtual machine, stopping/starting a virtual machine, terminating a virtual machine, creating a block volume, removing a block volume, etc.). The workflow thread may launch the VM workflow and oversee its execution by various other entities. In some embodiments, the workflow thread may pass any suitable portion of the intended state data of the DP resource to any suitable combination of services.

As a non-limiting example, as part of the workflow for launching a virtual machine (e.g., a VM to be hosted by hypervisor service 708), one or more APIs can be called for creating and attaching the VNIC. Similarly, a number of APIs may be provided for creating and/or attaching a block storage volume API. In some embodiments, the workflow thread may perform any suitable call to one or more APIs to invoke the functionality of PVN CP service 712, which in turn may be configured to create and attach a VNIC. The workflow thread may then call block storage CP service 714 which may then execute any suitable operations to create and attach a block storage volume. The worker thread overseeing the workflow may ensure a designated order (e.g., create the VNIC first before creating the block volume). This worker thread may be configured to catch any errors and/or exceptions from one or more services it has invoked. If no exceptions/errors are encountered, the worker thread overseeing the workflow can provide any suitable data to the hypervisor service 708 (via the substrate network), which in turn, execute functionality for creating the VM requested. The hypervisor service 708 may provide actual state data for the newly launched VM. In some embodiments, the worker thread overseeing the workflow can store the actual state data in the DB 704 for later reference (e.g., when a monitor may determine whether the actual state data matches the requested state data indicating no changes needed or when the actual state data fails to match the requested state data, indicating a change of the data plane resources is needed).

In some embodiments, the workflow thread may be communicatively coupled to a cluster manager (not depicted). Cluster manager may be configured to manage any suitable number of computing clusters. In some embodiments, the cluster manager may be configured to manage any suitable type of computing cluster (e.g., a Kubernetes cluster, a set of computing nodes used to execute containerized applications, etc.). The workflow thread may be configured to execute any suitable operations to cause the cluster manager to execute any suitable orchestration operation on the DP resource(s) (e.g., a VM) in accordance with the instructions identified to bring the DP resource(s) in line with the intended state data. In some embodiments, a monitoring entity (e.g., the workflow thread, a thread launched by the workflow thread) may be communicatively coupled to DP resource(s) 116 and configured to monitor the health of DP resource(s). In some embodiments, the monitoring entity may be configured to store any suitable health data in the DB 704.

The specific operations and services discussed in connection with FIG. 7 is illustrative in nature and is not intended to limit the scope of this disclosure. The particular operations performed, and services utilized may vary depending on the particular workflow associated with the requested operations.

Figure 8:
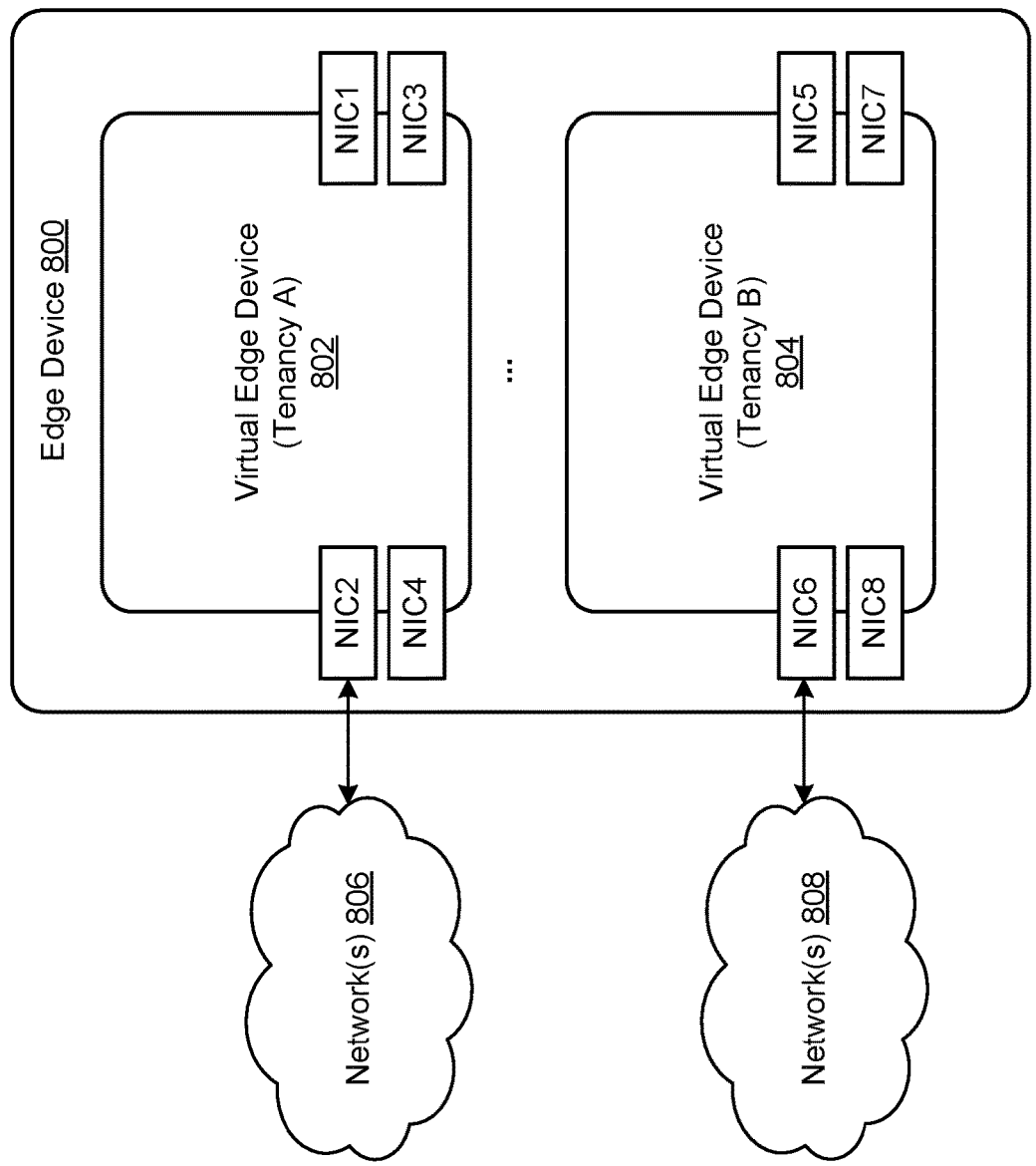
FIG. 8 is a block diagram depicting an edge device provisioned with multiple virtual edge devices, according to at least one embodiment.

FIG. 8 is a block diagram depicting an edge device 800 (e.g., a physical device) provisioned with multiple virtual edge devices, according to at least one embodiment. Edge device is intended to be an example of the edge device 500 of FIG. 5. As depicted, edge device 800 is configured with at least two virtual edge devices (e.g., virtual edge device 802 and virtual edge device 804). In some embodiments, the virtual edge devices may be associated with different compartments and/or tenancies (e.g., root compartments) of a centralized cloud-computing environment (e.g., Oracle cloud). By way of example, and as depicted, virtual edge device 802 and virtual edge device 804 may be associated with "Tenancy A" and "Tenancy B," respectively.

Each of the virtual edge devices of the edge device 800 may individually include any suitable combination of the various components discussed above in connection with the edge device 500 of FIG. 5. That is, each virtual edge device may include a substrate network (e.g., substrate network 504), service(s) (e.g., service(s) 502), virtual NIC(s) (e.g., virtual NIC(s) 506), virtual machines (e.g., virtual machine(s) 508), private virtual networks (e.g., private virtual network(s) 505, operating system(s) (e.g., operating system 530), and the like.

Each virtual edge device may include any suitable number of resources (e.g., services, volumes, virtual machines, images, etc.). At least some resources may execute as a container (e.g., a Docker container) locally on the virtual edge device. Any suitable number of service(s) executing at the virtual edge device may be communicatively connected via a substrate network such that the communications between services are encrypted (e.g., in accordance with a security protocol such as MACsec). Each container may be assigned a substrate IP address (e.g., a static address) with which traffic can be addressed. In some embodiments, a security protocol (e.g., MACsec) is configured at provisioning time (e.g., before the edge device 800 is shipped to the user). The virtual edge device's system software may execute in the secure environments protected by boot security software (e.g., Trenchboot Secure Launch). Users may be restricted from accessing the secure environment and/or the substrate network of a virtual edge device. To minimize the resources used by these services, the service code may be compiled and saved to disk to decrease RAM space as well as decrease the CPU load on the edge device 800. Example services are discussed in more detail above in connection with FIG. 5.

In some embodiments, virtual edge devices (and/or edge devices) that are associated with different tenancies or compartments may be restricted from communicating with one another. For example, services the virtual edge device 802 may communicate via a substrate network that is inaccessible to the services executing at virtual edge device 804, and vice versa.

As with the edge device 500, each virtual edge device implements various networking functionality via a number of services such as a network address translation (NAT) service, a dynamic host configuration protocol (DHCP) service, a domain name system (DNS) service, a network time protocol (NTP) service, a metadata service, and a public API service). The metadata service may provide initialization data and other metadata to all VM(s) executing at the virtual edge device. Any suitable networking operations discussed above in connection with FIG. 5 and edge device 500 may likewise be provided by each of the virtual edge devices of edge device 800, including virtual edge device 802 and/or virtual edge device 804.

In some embodiments, any suitable number of virtual machines (not depicted) operating at virtual edge devices 802 and 804 may implement block (or object) storage. Some of the functionality provided by the virtual edge devices is similar to the functionality provided by a single edge device and discussed above in connection with FIG. 7. In general, although each service may not be discussed in detail herein, the general functionality provided by each of the virtual edge devices may include the functionality of cloud services provided by a remote cloud service provider. In some embodiments, each of the virtual edge devices of the edge device 800 may be associated with a predefined region and/or realm such that at least some of the respective service(s) of the virtual edge devices may operate as if they were operating in a cloud computing environment, despite the fact they are operating on one or more local device(s) (one or more edge devices) as a single instance or as part of a distributed service that may have no or intermittent public network access to a cloud computing environment associated with the customer. A "region" refers to a geographic location at which a service center resides. A "realm" refers to a logical collection of regions. Realms may be isolated from each other and do not share data.

In some embodiments, each of the virtual edge devices may provide any suitable number of virtual networks using compute, memory, and networking resources (e.g., virtual network interface card(s) (e.g., VNIC(s) 506)). Using the service(s) provided a given virtual edge device, one or more customer resources or workloads, such as virtual machines, can be deployed on these private virtual networks. Any suitable combination of VM(s) can execute functionality (e.g., a compute instance, storage, etc.) which is individually accessible through a virtual NIC. Each VM that is part of a private virtual network (PVN) may be associated with a VNIC that enables the VM (e.g., a compute instance) to become a member of a subnet of the PVN. The VNIC associated with a VM facilitates the communication of packets or frames to and from the VM. A VNIC can be associated with a VM when the VM is created. PVN(s) 505 can take on many forms, including peer-to-peer networks, IP networks, and others. In some embodiments, substrate network traffic of the service(s) of a virtual edge device may be encrypted and/or isolated (e.g., by virtue of different PVNs or subnets) from network traffic of one or more other VMs executing at the virtual edge device.

Each virtual edge device of the edge device 800 thus provides infrastructure and a set of complementary services that enable customers to build and run a wide range of applications (e.g., compute instances), services, and/or storage in a highly available, physically local, and virtual hosted environment. By provisioning the edge device 800 with multiple virtual edge devices, the customer may configure a single physical device (e.g., the edge device 800) to be capable of executing potentially drastically different tasks, workloads, and operations, with potentially drastically different resources. In some embodiments, these virtual edge devices could execute concurrently, providing even more extensive computing resources than originally provided by a single edge device. This extends the versatility edge devices in general, reduces costs in overhead and manufacture, and enhances the user's experience.

Each of the virtual edge devices 802 and 804 may be communicatively connected to a user device (e.g., the computing device 202 of FIG. 2) via one or more network interfaces (e.g., NIC2 and/or NIC 6) and via networks 806 and/or 808, respectively, to interact and/or manage the resources and operations of each virtual edge device. In certain embodiments, a lightweight console can be provided at the user device via a web-based user interface that can be used to access and manage the edge device 800, including accessing and/or managing the virtual edge devices providing by the edge device 800. In some implementations, the console is a web-based application provided by a service of one or more of the virtual edge devices.

FIG. 8 depicts a single edge device (e.g., edge device 800). However, it should be appreciated that more than one edge device may be utilized as a distributed computing cluster. In general, any suitable operations, functionality, and/or resources provided by the edge devices of FIGS. 5 and 6, may be likewise provided by any virtual edge device.

Figure 9:
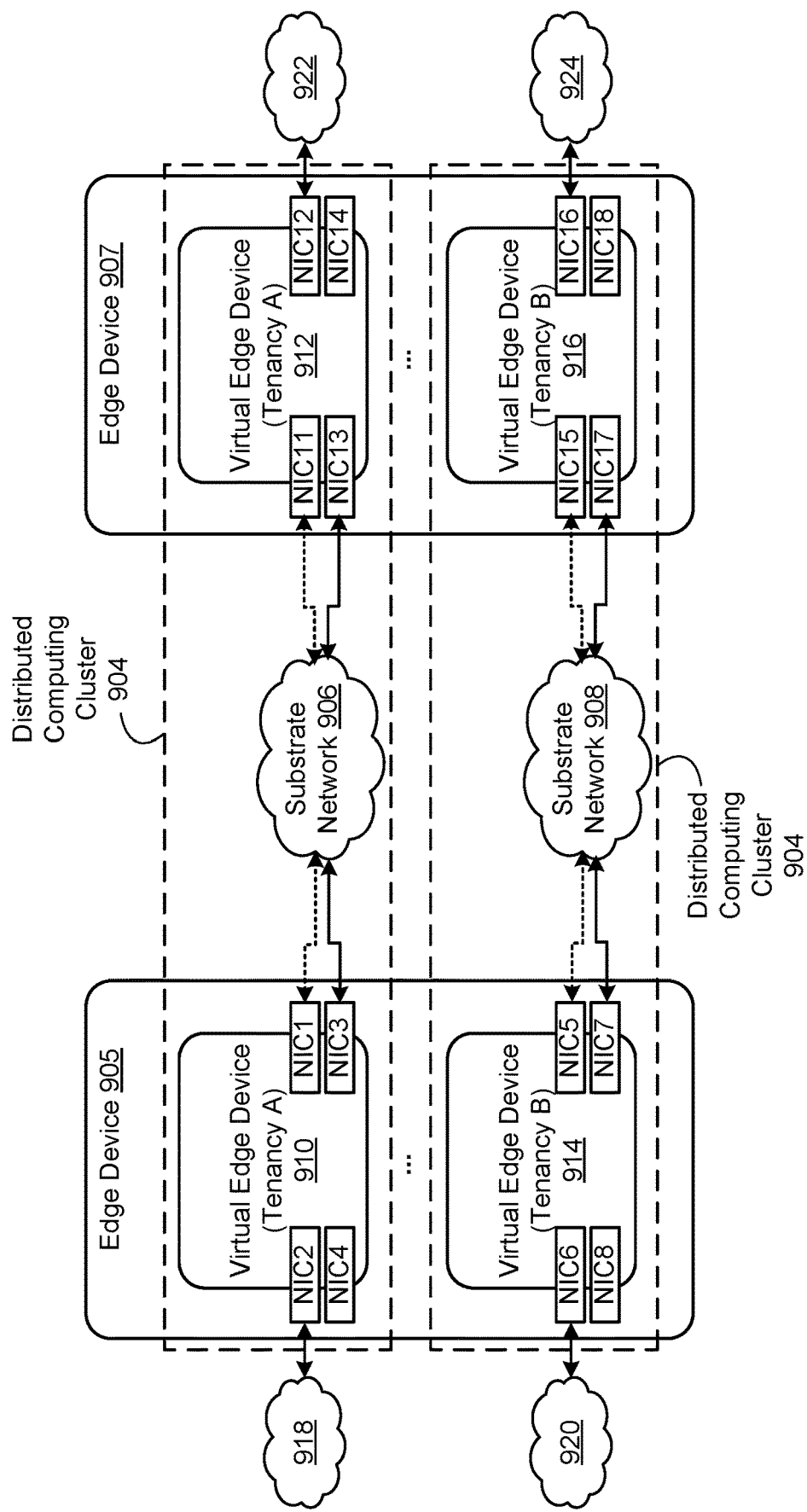
FIG. 9 is a block diagram depicting multiple distributed computing clusters that utilize virtual edge devices, according to at least one embodiment.

FIG. 9 is a block diagram depicting an environment 900 including multiple distributed computing clusters (e.g., cluster 902 and cluster 904) that utilize virtual edge devices (e.g., virtual edge devices 910-916), according to at least one embodiment. In some embodiments, the clusters 902 and/or 904 may utilize virtual edge devices from any suitable number of physical edge devices (e.g., edge device 905 and edge device 907).

Each virtual edge device of the distributed computing clusters 902 and 904 may be connected via corresponding substrate network (e.g., substrate network 906 and substrate network 908, respectively, each being an example of the substrate network 504 of FIG. 5). In some embodiments, the virtual edge devices of the distributed computing cluster 904 (e.g., virtual edge device 910 and virtual edge device 912) may be connected by the substrate network 906 using one or more switches (not depicted). In some embodiments, NIC1, NIC11, NIC5, and NIC15 may include a particular connector (e.g., RJ45 connector) while NIC3, NIC 13, NIC 8, and NIC18 may include the same or a different connector (e.g., a QSFP28 100 GbE connector). In some embodiments, only one virtual edge device of each the clusters 902 and 904 is connected to a customer network such as network(s) 920-924 (each an example of the network 520 of FIG. 5). In some embodiments, the network(s) 920-924 may differ or may be the same network. Not only may network traffic between services of a virtual edge device be encrypted and isolated from other traffic of a given virtual edge device, but traffic between distributed services operating across multiple virtual edge devices (e.g., on the same or different physical edge devices) may also be encrypted and isolated from other traffic of the computing cluster. In some embodiments, each virtual edge device is preconfigured as a particular node of its respective cluster. In other embodiments, the user can configure the number and topology of the virtual edge devices of the clusters 902 and/or 904.

In some embodiments, the virtual edge devices of one cluster (e.g., cluster 902) may be associated with a tenancy and/or compartment (e.g., "Tenancy A") that may be the same or differ from a tenancy and/or compartment (e.g., "Tenancy B") associated with the virtual edge devices of another cluster (e.g., cluster 904). Although FIG. 9 depicts each cluster as including only one virtual edge device of a given edge device, any suitable number of virtual edge devices of a single physical edge device (e.g., edge device 905) may be included in a distributed computing cluster.

Control Plane Implementations

Edge device clusters may often be used close the origin of data being collected. It may be the case that the data is consumed at processed at the edge, although, depending on the specific use case, data may be transferred to the centralized cloud for further processing. Network access is often intermittent in the environments in which these edge devices operate. The edge devices are configured to operate in disconnected or semi-connected mode while performing their respective tasks. Conventionally, data exchanges between the centralized cloud and the edge device cluster occurred between the edge device storing the data and the centralized cloud. Communicating with the centralized cloud to exchange (e.g., transmit and/or receive) data is slow, expensive, and is often infeasible. Therefore, it may be desirable to reduce the number of connections used and/or aggregate the data from the edge devices of the cluster and process the data at the edge. By way of example, a machine-learning algorithm may be trained using data collected at the edge. In some embodiments, analytics and inferencing may be executed at the edge. While it's common practice to train and retrain the machine-learning models in the centralized cloud and deploy workloads to the edge in fully connected environments, this is challenging in austere environments of ephemeral nature. This becomes more challenging when number of devices are in 100s and 1000s. A few well known problems while operating a distributed edge device cluster of this size are that:

- A distributed edge cluster of 100s-1000s of edge devices may require rapid deployment of a workload (e.g., a data collection workload).
- A distributed edge cluster of 100s-1000s of edge devices may require rapid deployment of software upgrades or patches.
- It is desirable to monitor 100s-1000s of edge devices during operation.
- Synchronizing data from an edge device may be desirable, but connectivity is limited.

In previous systems, each edge device was deployed with control plane components. Running a fully functional control plane may be wasteful as edge devices need not utilize a fully functional control plane to perform life cycle operations such as launching instances or containers or for reporting health. An edge device need only a subset of control plane functionality to continue executing its workload indefinitely, potentially in a disconnected fashion with no access to public and/or private networks. Running a large number of edge devices of a cluster (e.g., 50+ edge devices, 100+ edge devices), all with fully functional control planes multiplies the number of device failures experienced by the devices in the cluster.

To address these issues, each edge device may be initially configured (e.g., prior to shipping to the customer) with a fully functional version of a control plane component as well a lightweight version of the control plane component. As part of the processing of ordering a number of edge devices to be used with a new or preexisting edge devices cluster, a customer may specify one or more edge devices that are to operate a control plane. In some embodiments, the specified edge device(s) may be configured to operate a distributed control plane for the distributed computing cluster of edge devices. Each device of the edge device cluster may be referred to as a "node." A manifest may be generated and stored on each node. The manifest may identify, among other things, which edge devices of the cluster are designated as controller nodes and which edge devices are designated as worker nodes (e.g., edge devices that do not participate in providing control plane functionality for the cluster). In some embodiments, a single edge device may operate as both a controller node and a worker node.

A "controller node" (also referred to as a "control plane device") refers to an edge device of an edge device cluster that is configured with a full version of a control plane component. A controller node may use the configured control plane component to provide a full range of control plane functionality including but not limited to transmitting and/or receiving data to/from a centralized cloud, performing updates on the edge devices of the cluster, synchronizing (e.g., between) data between one or more cluster edge devices and the centralized cloud, deploying workloads to any suitable edge device of the cluster, launching instances or containers at any suitable edge device, reporting and/or processing health data obtained from the edge devices of the cluster, and the like. A "worker node" refers to an edge device that executes limited control plane functionality or no control plane functionality at all. By way of example, a worker node may be configured with a lightweight version of a control plane component that may be used to provide health data reporting and to launch instances and/or containers at the worker node for workload performance purposes. In some embodiments, the lightweight control plane component may allow the worker node to restart instances and/or containers that were already running on the worker node (e.g., due to being initiated by a controller node) but the lightweight control plane component may lack functionality to start new instances and/or containers. The lightweight control plane component may enable control plane functionality to be applied to the worker node on which it runs, but may not be used to provide control plane functionality with respect to other nodes of the distributed computing cluster to which that node belongs. Using this component, worker nodes may include a sufficient amount of control plane functionality to continue operating on an assigned workload, indefinitely, even if disconnected from the control plane device(s) but lack at least some portion of the full range of control plane functionality provided by the controller node(s).

The edge devices may be physically provided to the customer. At any suitable time after startup, the edge devices may be configured to obtain the manifest. In some embodiments, the customer may log on to any one of the edge devices to specify (e.g., via a user interface) one or more edge devices to be used to operate a control plane for the cluster. If an edge device identifies it is designated as a control plane device/controller node (e.g., in the manifest provided or via user input), it may execute instructions for configuring the control plane to be used to manage the distributed computing cluster. In some embodiments, the first edge device that identifies itself as being designated as a control plane device/controller node may configure the remaining nodes of the cluster according to the manifest (or user input). In some embodiments, configuring other nodes may include providing instructions to disable a portion of the other node's control plane according to the manifest (or user input).

Once configured, the controller nodes may enable rapid deployment of data collection workloads by utilizing fewer connections (e.g., one connection for each control plane device rather than corresponding connections to every device in the cluster) to the centralized cloud to obtain the data collection workload. Once obtained, the control plane device(s) may rapidly deploy the workloads to the worker nodes, alleviating the vast majority of connections used in previous approaches. Similarly, the control plane device(s) may utilize a select few connections (e.g., connections corresponding to the control plane devices) to obtain software updates and/or patches and to deploy the same to each of the edge devices of the cluster. In some embodiments, deploying the workload, software updates, and/or patches may occur the next time communication is made with a disconnected worker node (e.g., a worker node that currently lacks access to a public and/or private network for communication purposes).

Once configured, the worker nodes may execute workloads while connected or disconnected to the control plane devices. In some embodiments, when connected, the worker nodes may utilize the lightweight version of the control plane component to provide health status data to the control plane device(s).

Utilizing these techniques, deployment, updates, and patches may be more rapidly executed than in previous implementations. The resources executing on each edge device of a distributed computing cluster may be reduced, which in turn reduces the risk of failures occurring in the edge devices of the cluster. Additionally, as the size of the cluster may change over time, the number of control plane devices may be adjusted (e.g., by the customer, via the centralized cloud, etc.) such that the number of devices utilized for the control plane is sufficient to handle the number of worker nodes and workloads employed. Thus, a configurable control plane is provided as disclosed in the following figures.

Figure 10:
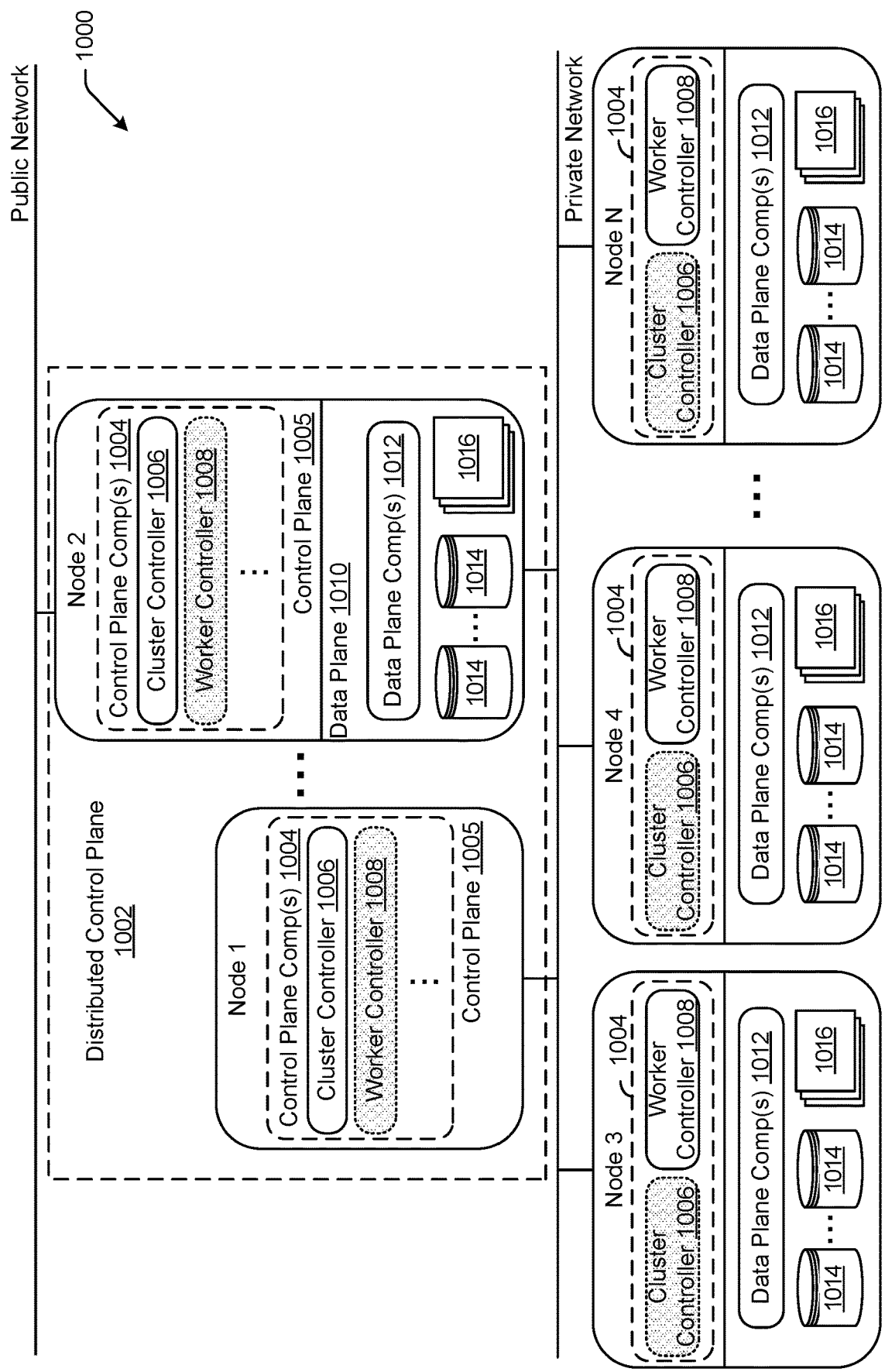
FIG. 10 is a block diagram depicting an example computing cluster including five computing nodes, where a subset of the nodes implements a control plane for the computing cluster, according to at least one embodiment.

FIG. 10 is a block diagram depicting an example (distributed) computing cluster 1000 including five computing nodes, according to at least one embodiment. Although five computing nodes are depicted, any suitable number of computing nodes (each an example of the edge device 500 of FIG. 5, or the virtual edge device 802 of FIG. 8) may be utilized.

As part of the manufacture process for computing nodes 1-5, each computing node may be configured with computing components (e.g., control plane component(s) 1004 of control plane 1005). A computing component (a "component," for brevity), may include any suitable software components, hardware components, virtual machines, and/or containers that are configured with executable code. Control plane component(s) 1004 may include any suitable number of computing resources that are configured to provide control plane functionality (e.g., for one or more respective services). By way of example, control plane component(s) 1004 may include software components, hardware components, virtual machines, and/or containers that are config-ured with code that, when executed, provide, among other things, control plane functionality as described herein. In some examples, control plane component(s) 1004 may provide control plane functionality corresponding to any suitable number of services (e.g., the service(s) 502 of FIG. 5 such as a compute service, block storage service, object storage service, and the like). Control plane component(s) 1004 of each node may include cluster controller 1006 and worker controller 1008. Cluster controller 1006 may be configured to provide a full range of control plane functionality including but not limited to transmitting and/or receiving data to/from a centralized cloud, performing updates on the edge devices of the cluster, synchronizing (e.g., between) data between one or more cluster edge devices and the centralized cloud, deploying workloads to any suitable edge device of the cluster, launching instances or containers at any suitable edge device, reporting and/or processing health data obtained from the edge devices of the cluster, and the like. Worker controller 1008 may be configured as a lightweight version of cluster controller 1006 (e.g., including a subset of the full functionality provided by cluster controller 1006 or separate functionality all together). In some embodiments, worker controller 1008 may be used to provide health, usage and/or performance information related to data plane resources (e.g., health, usage, and/or performance of the OSDs 1014 and/or resources 1016). Worker controller 1008 may be configured to launch instances and/or containers at the worker node for workload performance purposes. In some embodiments, worker controller 1008 may be configured to restart instances and/or containers that were already running on a node but may lack functionality to start new instances and/or new containers.

Control plane 1005 may include additional components not depicted in FIG. 10 such as a storage gateway (e.g., for mapping data received from one format to another format, such as a storage format), public application programming interface (e.g., for transmitting/receiving data from a centralized cloud via network(s) 620), an authentication component (e.g., configured to authenticate and/or authorize, via credentials or otherwise, a user or entity requesting performance of one or more operations), and the like. In some embodiments, control plane 1005 may include components configured to manage orchestration and/or deployment of virtual machine instances and/or workloads across a distributed data plane of the nodes 105. By way of example, cluster controller 1006 may include the functionality discussed in connection to API service 702 for launching a virtual machine. PVN CP service 712 and block storage CP service 714 may individually be included in cluster controller 1006 or separately as part of control plane component(s) 1004. In some embodiments, a node (e.g., node 1) may be configured to include only a control plane and corresponding a set of control plane components and may lack any data plane or corresponding data plane components and/or resources. In some embodiments, only node of the distributed control plane 1002 (as depicted, nodes 1 and 2) may be connected to a public network (e.g., to a data center and/or centralized cloud when connectivity allows).

In some embodiments, any suitable number of nodes 1-5 (e.g., nodes 2-5, as depicted) may include a data plane 1010 configured with one or more data plane component(s) 1012 and/or configured to host one or more virtual resources such as object storage device(s) 1014 and/or resources 1016. Data plane component(s) 1012 may include software components, hardware components, virtual machines, and/or containers that are configured with code that, when executed, provide, among other things, data plane functionality as described herein. Resources 1016 may include any suitable combination of one or more virtual machines and/or containers. Data plane component(s) 1012 may be configured to perform various operations with the virtual resources hosted in the data plane 1010. In some embodiments, data plane component(s) 1012 may be associated with any suitable number of services that expose capabilities of the data plane resources (e.g., OSDs 1014, resources 1016, etc.). By way of example, data plane component(s) 1012 may include worker service 706 and/or hypervisor service 708 of FIG. 7. In some embodiments, data plane component(s) 1012 may be configured to perform operations according to instructions and/or data provided by control plane component(s) 1004. These instructions and/or data may be obtained directly from the control plane component(s) 1004 or indirectly (e.g., via DB 704 of FIG. 7). As depicted, nodes 2-5 may implement any suitable number of respective OSDs 1014. OSDs 114 may individually be a Ceph block device. A Ceph block device may be a thinly-provisioned and resizable data store that is striped over multiple object storage devices (e.g., a subset of the OSDs 1014). In some embodiments, any suitable node of the distributed control plane 1002 (e.g., node 1 and/or node 2) may expose an S3-compatible API and/or an object storage API to clients (e.g., via a storage gateway not depicted). In some embodiments, these APIs and/or storage functionality may be provided via cluster controller 1006.

Once configured during a manufacturing process, the nodes 1-5 may be physically provided to a customer. At any suitable time after startup, the nodes 1-5 may be configured to obtain the manifest. If a node identifies from the manifest that it is designated as a control plane device, the node may execute instructions for configuring the control plane and/or the worker nodes of the distributed computing cluster 1000. As a non-limiting example, node 1 may, at any suitable time after start-up, obtain a manifest from local memory. Node 1 (and any suitable node of nodes 2-5) may execute any suitable combination of the control plane component(s) 1004 (e.g., including a control plane configuration service, not depicted) to read and process the manifest stored in memory. As part of this execution, node 1 may determine that the manifest designates nodes 1 and 2 as being control plane devices and/or nodes 3-5 as data plane devices. In response to this determination, node 1 (e.g., the control plane configuration service of node 1) may execute operations to configure the remaining nodes of the cluster according to the manifest. In some embodiments, a node may configure itself in accordance with the manifest based on executing instructions to disable a portion of its own control plane. Disabling a portion of a control plane may include stopping a virtual machine and/or container on which that portion of the control plane executes. By way of example, node 1 may configure itself to operate as a control plane device and as part of the distributed control plane 1002 based on stopping, suspending, or removing a virtual machine and/or a container on which the worker controller 1008 executes.

In some embodiments, configuring other nodes may include transmitting instructions to other nodes of the distributed computing cluster to disable a portion of the other node's control plane according to the manifest. By way of example, cluster controller 1006 may execute operations to provide instructions to nodes 3-5. In some embodiments, nodes 3-5 may include a control plane component (e.g., corresponding to a control plane configuration service) that is configured to receive or obtain these instructions (e.g., via API and/or from DB 704). In response to these instructions, the control plane component of each of nodes 3-5 may execute operations to disable a portion of their respective control planes. Disabling a portion of a control plane may include disabling (e.g., suspending, stopping, removing, etc.) a part or a whole control plane computing component. As a non-limiting example, the instructions corresponding to nodes 3-5, when executed, may cause nodes 3-5 to disable their respective cluster controller 1006. In some embodiments, a node (e.g., node 2) may be designated as being both a control plane device and a data plane device within the manifest. Thus, in some embodiments, node 1 may forgo transmitting instructions for node 2 and node 2 may continue to operate both cluster controller 1006 and worker controller 1008. In some embodiments, when worker controller 1008 includes a subset of the functionality of cluster controller 1006, node 2 may be instructed to disable worker controller 1008 in order to use cluster controller 1006 and to avoid duplicated functionality. In some embodiments, cluster controller 1006 and worker controller 1008 may be provided by a common control plane computing component. In these scenarios, disabling cluster controller 1006 or worker controller 1008 may be considered disabling a portion of a common control plane computing component. Even though node 2 may be configured to host data plane resources, in some embodiments, being designated as a control plane device may cause the data plane 1010 of node 2 to remain unused. In some embodiments, data plane resources such as OSDs 1014 and/or resources 1016 may be hosted by nodes that are not operating as part of the distributed control plane 1002.

The control plane device(s) of distributed control plane 1002 (in this example, nodes 1 and 2) may perform any suitable operations for configuring any suitable node of the distributed computing cluster 1000, deploying workloads to the distributed computing cluster 1000, performing system updates and/or patches of the distributed computing cluster 1000, and synchronizing data to and/or from the nodes of distributed computing cluster 1000. Some example operations performed for these use cases are described in more detail with respect to FIGS. 11-14.

Cluster controller 1006 may be configured to monitor data plane resources (e.g., OSDs 1014, resources 1016) for failures using one or more protocols for solving consensus in a network of unreliable or fallible processors (e.g., PAXOS algorithms, RAFT algorithm, etc.). Consensus refers to the process of agreeing, by the computing nodes, on one result among the group. In some embodiments, cluster controller 1006 stores metadata on disk and provides rules and maps to clients and OSDs to enable object (e.g., data block, data object, etc.) reading and writing.

In some embodiments, the cluster controller 1006 (operating at nodes 1 and 2 in this example) may be configured to replace cluster controller(s) that fail (e.g., due to node failure or otherwise). In some embodiments, replacing a cluster controller may include reconfiguring a data plane device (e.g., node 3) as a control plane device. Reconfiguring a data plane device may include redistributing data plane resources or data to other nodes (e.g., other data plane devices) of the distributed computing cluster 1000 and providing instructions that cause the node to enable cluster controller 1006 and disable worker controller 1008. Any suitable operations for enabling and/or disabling control plane components (e.g., including starting and/or stopping virtual machines and/or containers on which those components run) can be executed as part of a control plane configuration component (not depicted) of the control plane component(s) 1004 of any of the nodes of the distributed computing cluster 1000. In some embodiments, In some embodiments, this control plane configuration component may execute alongside the cluster controller 1006 and/or the worker controller 1008 to provide functionality for configuring and/or reconfiguring a respective node as a control plane device and/or as a data plane device. Should one or more additional nodes be added to the distributed computing cluster 1000, any suitable node of the distributed control plane 1002 may obtain an updated manifest, process the manifest to identify which of the new nodes are to operate as control plane devices and which are to operate as data plane devices, and may transmit instructions to those devices to configure their corresponding control plane components accordingly.

In some embodiments, distributed computing cluster 1000 may implement a distributed, fault tolerant system (e.g., Ceph) that provides redundancy for object storage, block storage, and VM images. An authentication data plane component of data plane component(s) 1012 of nodes 3-5 may be an example of an authentication and/or authorization component that is configured to authenticate (via credentials or otherwise) and/or authorize (via evaluating user information against access policies) a user to perform one or more operations via a storage system implemented by the distributed computing cluster. In some embodiments, a storage gateway of cluster controller 1006 of nodes 1 and/or 2 may be configured to invoke the functionality of the authentication data plane component of nodes 3-5 to authorize and/or authenticate a requestor (e.g., a user, another service, etc.). In some embodiments, the storage gateway may be configured to map data received from a format associated with a public API (e.g., an S3-compatible API, an object storage API), to an application programming interface associated with the data store implemented by the OSDs of nodes 3-5.

In some embodiments, the cluster controller 1006 may be used to control data placement. In some embodiments, these rules may include rules for Controlled Replication Under Scalable Hashing (CRUSH). The rules may allow data placement to be done with the greatest fault tolerance allowed by the configuration. The rules may build a hierarchy and/or map (e.g., one or more CRUSH maps) that describes the relationship of the nodes (and/or OSDs) in the distributed computing cluster 1000. For example, a CRUSH map may be utilized to specify which OSDs are on a common host, etc. A widely distributed cluster then can be reflected in the rules to allow for the greatest distribution of data as needed for durability and performance. For instance, some data may be required to be replicated across a larger number of OSDs for greatest durability, other data may have replication within a smaller number of OSDs for less durability but shorter time to access.

In some embodiments, the rules provided by cluster controller 1006 may be used to determine how data is distributed, and these rules are bounded by counts of OSDs and placement groups. A stable OSD cluster achieves scalability by distributing this information among all clients and OSDs so objects can be accessed without needing a central resource. In some embodiments, expanding the distributed computing cluster 1000 may impact this data distribution and the map may be altered with an addition of new node(s). Once modified, the cluster may need to go thru a redistribution of data. The amount of time this requires is dependent upon the current use of object storage and the amount of change.

In some embodiments, when a disk fails, the OSD may be removed (e.g., by the cluster controller 1006) from the cluster map, the failed disk removed from the node, and replaced with a new disk. The new disk may be prepared in a manner as to have the same cluster-wide OSD identity as the previous disk. In some embodiments, detecting a replaced node may cause cluster controller 1006 to begin a background redistribution of data to balance data across the distributed computing cluster 1000 which may include populating OSDs on the replacement node.

Although the distributed control plane 1002 is depicted as utilizing multiple nodes (e.g., corresponding to multiple edge devices and/or virtual edge devices), the distributed control plane 1002 made up of a single edge device.

Some example workloads that may be performed by the distributed computing cluster 1000 may include:

Collecting images/videos (e.g., via one or more sensor devices of the nodes 3-5, not depicted), storing the images/videos within object storage implemented by OSDs 1014 of nodes 3-5, and performing post-processing of the collected data using a custom virtual machine (VM) running in the distributed computing cluster 1000. The post-processing may be performed by a specialized computing component deployed at any suitable node of nodes 1-5.

Loading database backup files by creating a custom VM and attaching a block storage volume to the VM, running the custom VM at nodes 3-5 and instantiating the database using the backup files and the block volume.

Loading data and managing a customer application in an offline mode. Performing a two-way sync with a cloud environment (e.g., a data center, a centralized cloud) when connectivity is available.

Loading data via NFS mounts or object storage API's (e.g., APIs associated with object storage implemented by nodes 3-5) and accessing the data via NFS mounts or object storage API's. When combined with syncing, this can serve to achieve data migration from on-site NAS servers to a centralized cloud (e.g., an Oracle Cloud Infrastructure (OCI) platform).

Developing an application on-site that use a cloud API (e.g., an OCI platform API) and migrating the application to the cloud environment. Similarly, taking customer applications that run against the centralized cloud environment (e.g., OCI) and running them against the object storage implemented by the nodes of the distributed computing cluster 1000 operating as data plane devices (e.g., nodes 3-5 in the example of FIG. 10).

Moving on to FIGS. 11-14 which describe example operations of a control plane of a distributed computing cluster of edge devices. Although the examples of FIG. 11 describes the distributed computing cluster as including edge devices (e.g., distributed computing cluster 600 of FIG. 6), these examples may be similarly applied to a distributed computing cluster including virtual edge devices (e.g., distributed computing cluster 904 of FIG. 9). Each of the edge devices of FIGS. 11-14 are intended to be an example of one of the edge devices or virtual edge devices discussed above in connection to 5, 6, 8, 9, and/or the nodes of FIG. 10.

Figure 11:
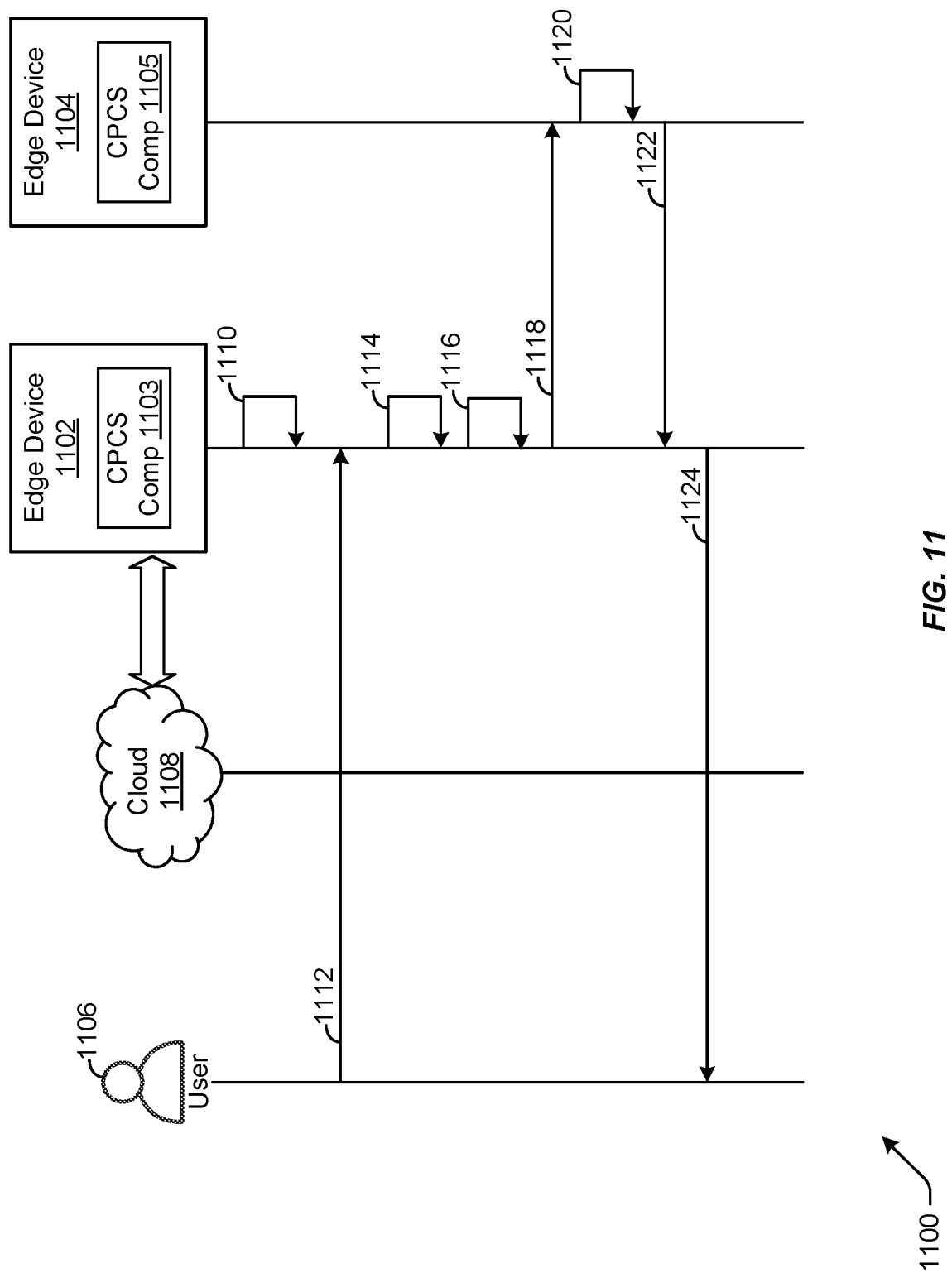
FIG. 11 is a flow diagram depicting an example method for configuring a control plane of a distributed computing cluster of edge devices, according to at least one embodiment.

FIG. 11 is a flow diagram depicting an example method 1100 for configuring a control plane of a distributed computing cluster of edge devices (e.g., the distributed computing cluster 600 of FIG. 6, the distributed computing cluster 1000 of FIG. 10, etc.), according to at least one embodiment. Method 1100 may be performed with edge device 1102 and edge device 1104 and/or any suitable edge device of a distributed computing cluster. In some embodiments, edge devices 1102 and 1104 are part of edge device cluster. Prior to execution of method 1100, edge device 1104 may be configured with multiple control plane components such as an instance or container configured to execute cluster controller 1006 and an instance or container configured to execute worker controller 1008 of FIG. 10. Any suitable edge device (e.g., edge device 1102) may be configured with control plane components only (including cluster controller 1006 and worker controller 1008, as depicted in node 1 of FIG. 10) or an edge device may be configured with control plane components and data plane components as depicted in nodes 2-5 of FIG. 10. As depicted, edge device 1102 may execute a control plane configuration service (CPCS) component (e.g., CPCS component 1103, an example of one of the control plane component(s) 1004 of FIG. 10) that, in some embodiments, performs the respective operations of edge device 1102 as described herein. Likewise, edge device 1104 may execute CPCS component 1105, which may perform, at least in part, the respective operations of edge device 1104 as described herein.

The method 1100 may begin at 1110, where edge device 1102 may optionally obtain a manifest and/or other configuration data from local storage. In some embodiments, the manifest/configuration data indicates a configuration for a distributed computing cluster including at least edge device 1102 and edge device 1104. In some embodiments, the manifest/configuration data may be stored at the edge devices 1102 during a manufacturing process. In some embodiments, edge device 1104 may also store the manifest/configuration data. However, in some cases, the manifest/configuration data may be stored only on edge devices that the manifest/configuration data identifies as a control plane device (e.g., a device that is to operate as part of a distributed control plane such as distributed control plane 1002 of FIG. 10). In some embodiments, only control plane devices such as edge device 1102 provide a connection to cloud 1108 (e.g., a centralized cloud).

In some embodiments, a manifest and/or configuration data may be provided by user 1112 at 1104. By way of example, the user 1106 may log on to edge device 1102 and access a user interface for providing a manifest and/or configuration data for the distributed computing cluster to which edge device 1102 and edge device 1104 are associated.

As a non-limiting example, a manifest received at 1110 (or alternatively at 1112) may indicate that edge device 1102 is to operate as a control plane device and that edge device 1104 is to operate as a data plane device.

At 1114, the edge device 1102 may identify whether one or more control plane components corresponding to a data plane device are currently enabled at the edge device 1102. By way of example, the edge device 1102, having identified from the manifest that it is to operate as a control plane device (e.g., as part of distributed control plane 1002), may determine whether an instance or container executing worker controller 1008 is running at edge device 1102. If so, the edge device 1102 may execute any suitable operations for disabling the instance/container executing worker controller 1008 at the edge device 1102.

At 1116, the edge device 1102 may identify one or more other edge devices of the distributed computing cluster specified in the manifest/configuration data received at 1110 or 1112. In some embodiments, edge device 1104 may be identified as another edge device of the distributed computing cluster. The manifest/configuration data may identify/designate edge device 1104 (e.g., by identifier) as a control plane device or a data plane device.

At 1118, the edge device 1102 may transmit instructions (directly, or indirectly) to each of the edge devices identified in the manifest/configuration data received at 1110 or 1112. If edge device 1104 is identified/designated by the manifest/configuration data as being a control plane device, the instructions for edge device 1104 may, when executed at 1120, cause edge device 1104 to disable an instance or container executing worker controller 1008 of FIG. 10. If edge device 1104 is identified/designated by the manifest/configuration data as being a data plane device, the instructions for edge device 1104 may, when executed at 1120, cause edge device 1104 to disable an instance or container executing cluster controller 1006 of FIG. 10. The instructions transmitted 1118 may be transmitted by edge device 1102 to each of the other edge devices of the cluster until each of the other edge devices is executing control plane components that correspond to each edge device(s) role (e.g., control plane device, data plane device) as specified by the manifest/configuration data obtained at 1110 or 1112.

At 1122, the edge device 1104 may transmit data to edge device 1102 to indicate that that configuring the edge device 1104 according to the instructions provided at 1118 was successful or unsuccessful. An indication that configuring the edge device 1104 was successful may indicate that stopping/pausing/or deleting the control plane component in accordance with the instructions provided at 1118 was successful and/or that the edge device has been configured in accordance with the manifest/configuration data. An indication that configuring the edge device 1104 was unsuccessful may indicate that stopping/pausing/or deleting the control plane component in accordance with the instructions provided at 1118 was unsuccessful and/or that the edge device 1104 has been configured in accordance with the manifest/configuration data.

In some embodiments, when the manifest/configuration data is received from the user at 1112, the edge device 1102 may present to the user any suitable data indicating the status (e.g., successful/unsuccessful) of configuring each of the edge devices of the cluster (e.g., configuring edge device 1102 and/or edge device 1104).

Figure 12:
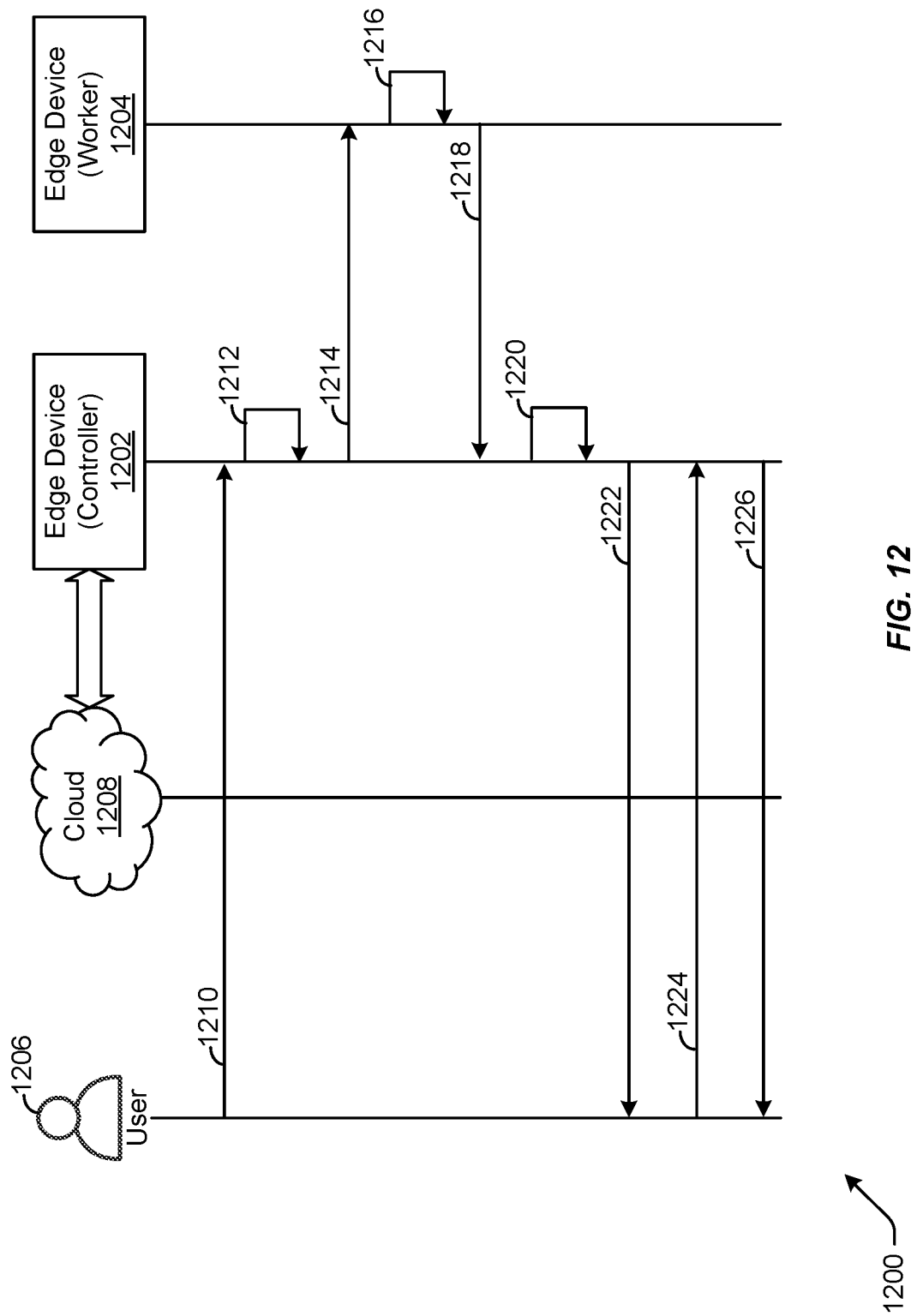
FIG. 12 is a flow diagram depicting an example method for deploying a workload to a distributed computing cluster of edge devices, according to at least one embodiment.

FIG. 12 is a flow diagram depicting an example method 1200 for deploying a workload to a distributed computing cluster of edge devices (e.g., the distributed computing cluster 600 of FIG. 6, the distributed computing cluster 1000 of FIG. 10, etc.), according to at least one embodiment. In some embodiments, edge device 1202 and edge device 1204 participate as part of the same distributed computing cluster. It is presumed that edge devices 1202 and 1204 have undergone the operations discussed in connection with FIG. 11 that configure each device with suitable control plane components (e.g., cluster controller 1006 and/or worker controller 1008 of FIG. 10) prior to the commencement of the operations discussed in connection with method 1200. For the purposes of the example of FIG. 12, edge device 1202 is presumed to be configured as a control plane device (also referred to as "controller 1202") that operates an instance of cluster controller 1006 and edge device 1204 is presumed to be configured as a data plane device (also referred to as a "worker 1204") that operates an instance of worker controller 1008.

The method 1200 may begin at 1210, where a request may be received (e.g., via user input provided by the user 1206 via an interface locally hosted by controller 1202 via cluster controller 1006 or another suitable control plane component). The request received at 1210 may indicate a request to launch and/or stop one or more instances on one or more edge devices (e.g., edge device 1204) of a distributed computing cluster in which controller 1202 participates and/or manages as part of a distributed control plane (e.g., the distributed control plane 1002 of FIG. 10). In some embodiments, the request may indicate a request to launch and/or stop a particular workload or instance of every edge device of the distributed computing cluster, including controller 1202.

At 1212, controller 1202 may refer to or store any suitable data related to deploying instances/workloads to edge devices of the distributed computing cluster. If the request received at 1210 is a request for a new instance/workload, the controller 1202 may store a record indicating that deployment of the instance/workload has been initiated. Launching an instance may, in this example, refer to launching a virtual machine instance and/or a container. If the request received at 1210 is a request to stop an instance/workload, the controller 1202 may identify which workers to which the request refers. By way of example, if the request does not specify particular workers and instead identifies the instance/workload alone, the controller 1202 may identify from previously stored records that applicable instances/workloads were previously deployed to one or more specific edge devices including, in this example, worker 1204. If the request includes identifiers for the particular instances/workloads and/or the particular edge devices to which those instances/workloads were previously deployed, the controller 1202 may skip the operations at 1212 and/or the controller 1202 may use the stored data to validate the accuracy of the requested action (potentially rejecting the request if the requested data does not match the stored deployment records).

At 1214, controller 1202 may transmit (e.g., via cluster controller 1006) instructions to worker 1204 instructing the worker 1204 to perform the desired action. In situations in which the request was to launch an instance/workload, the instructions may instruct worker 1204 to launch a virtual machine and/or container corresponding to the requested instance/workload or otherwise begin execution of the task associated with the workload. In situations in which the request was to stop an instance/workload, the instructions may instruct worker 1204 to stop a virtual machine and/or container corresponding to the requested instance/workload or otherwise halt execution of the task associated with the workload. The instructions provided by controller 1202 may be in the form of a desired state of the data plane resources of the worker to which the instructions are provided.

At 1216, worker 1204 may receive (e.g., via worker controller 1008) the instructions from controller 1202. In response, the worker 1204 may execute operations for performing the requested action based at least in part on instructing its corresponding data plane components (e.g., data plane component(s) 1012) to perform applicable operations to bring the state of data plane resources at the worker 1204 in line with the request (e.g., in line with the desired state potentially provided from controller 1202). If the request is to launch an instance/workload (also referred to generally as a "deployment"), the operations performed by worker 1204 may include, but are not limited to, launching a virtual machine, container, attaching data plane and/or networking resources, starting a workload (e.g., a set of tasks performable by the virtual machine/container on which the workload runs), or any suitable deployment operations. If the request is to stop an instance/workload, the operations performed by worker 1204 may include, but are not limited to, suspending, stopping, or removing a virtual machine or container, stopping or removing data plane and/or networking resources, stopping execution of a workload, and the like.

At 1218, worker 1204 may provide status to controller 1202 indicating whether implementing the deployment instructed at 1214 was successful or unsuccessful. If unsuccessful, worker 1204 may be configured to provide (e.g., via worker controller 1008 based on status provided by data plane component(s) 1012) an indication as to one or more reasons that the requested deployment was unsuccessful.

At 1220, controller 1202 may update its stored record based on receiving the data at 1218. If the status received from worker 1204 indicates that the requested deployment was unsuccessful, the controller 1202 may log the status as an update to the record associated with worker 1204 or potentially delete the record from storage. If the status received from worker 1204 indicates the requested deployment was successful, the controller 1202 may log the status in the record associated with worker 1204.

At 1222, controller 1202 (e.g., via cluster controller 1006) may present the status of the deployment at a user interface hosted by controller 1202.

At 1224, and at any suitable time, the user may initiate a request to view deployment status of any suitable deployment on any suitable number of edge devices of the distributed computing cluster. At 1226, controller 1202 may respond to this request by presenting the current status corresponding to those edge devices referred to in the request of 1224. Responding to the request may include obtaining the status information from the stored record referred to at 1212 and 1220. While deployments are in the process of being implemented (e.g., at 1216), the status of the requested deployment may indicate the deployment is in progress.

Figure 13:
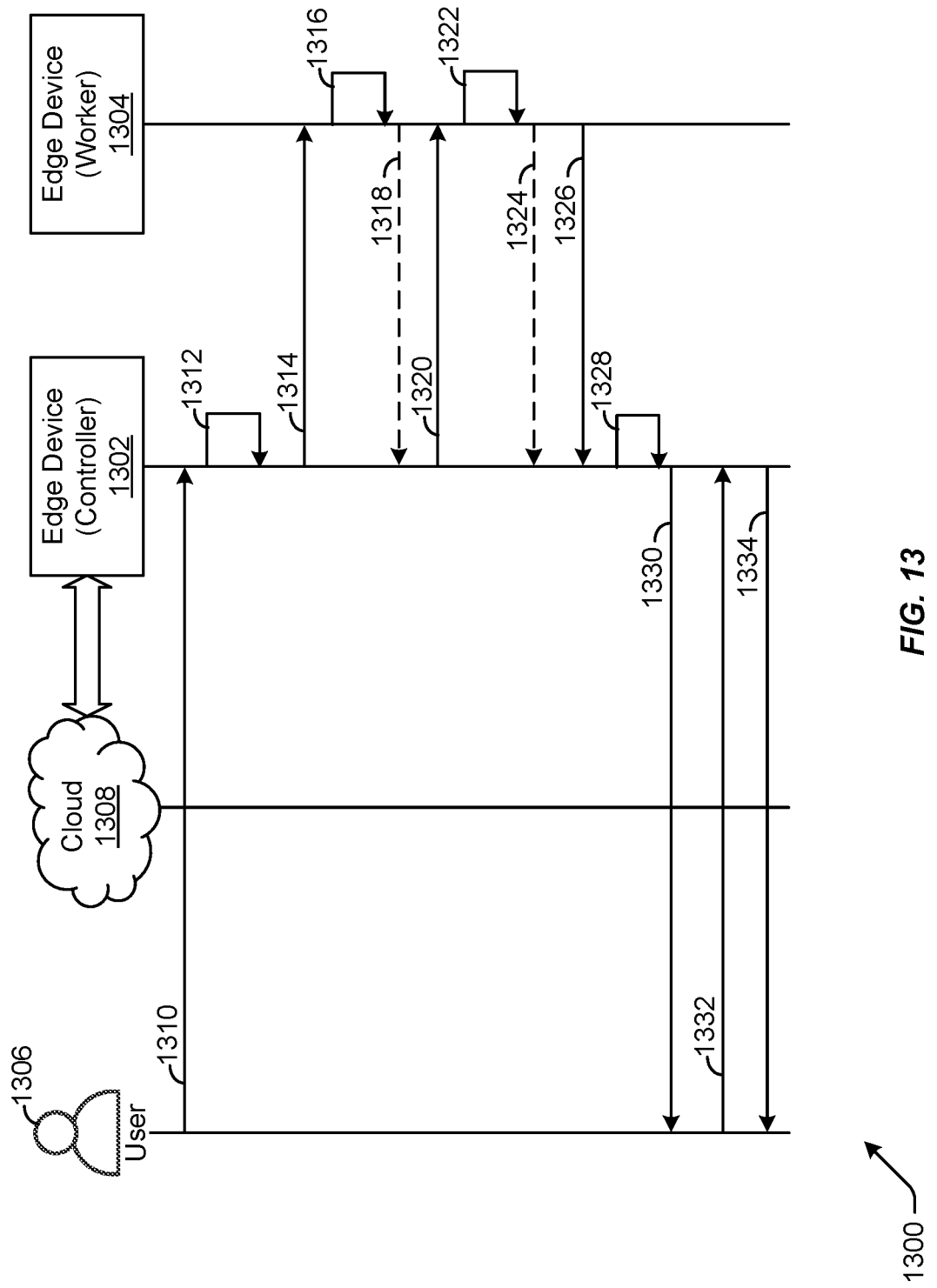
FIG. 13 is a flow diagram depicting an example method for performing an update on one or more edged devices of a distributed computing cluster of edge devices, according to at least one embodiment.

FIG. 13 is a flow diagram depicting an example method 1300 for performing an update performing an update on one or more edged devices (e.g., edge device 1304) of a distributed computing cluster of edge devices, according to at least one embodiment. The edge devices 1302 and 1304 each be an example of an edge device of a distributed computing cluster (e.g., the distributed computing cluster 600 of FIG. 6, the distributed computing cluster 1000 of FIG. 10, etc.). It is presumed that edge devices 1302 and 1304 have undergone the operations discussed in connection with FIG. 11 that configure each device with suitable control plane components (e.g., cluster controller 1006 and/or worker controller 1008 of FIG. 10) prior to the commencement of the operations discussed in connection with method 1300. For the purposes of the example of FIG. 13, edge device 1302 is presumed to be configured as a control plane device (also referred to as "controller 1302") that operates an instance of cluster controller 1006 and edge device 1304 is presumed to be configured as a data plane device (also referred to as a "worker 1304") that operates an instance of worker controller 1008.

The method 1300 may begin at 1310, where a request may be received (e.g., via user input provided by the user 1306 via an interface locally hosted by controller 1302 via cluster controller 1006 or another suitable control plane component). The request received at 1310 may indicate a request to perform an update of one or more of the edge devices of a distributed computing cluster in which edge device 1302 participates and/or manages as part of a distributed control plane (e.g., the distributed control plane 1002 of FIG. 10). In some embodiments, the request may include or otherwise identify the update to be applied.

At 1312, controller 1302 may perform operations for validating the request, identifying edge devices to which the update is applicable, obtaining the required data for performing the update, or the like. If the request does not specify particular workers to which the update applies, the controller 1202 may identify, from previously stored records, all workers and/or controllers of the cluster. Some updates may be presumed to apply to workers only, some to controller only, and some to both workers and controllers. If the request includes corresponding identifiers for one or more respective edge devices, the controller 1302 may forgo operations directed to using stored data to identify edge devices. In some embodiments, even when particular one or more edge devices are identified in the request, the controller 1302 may utilize the stored data to validate the accuracy of the requested action (potentially rejecting the request if the requested data does not match the stored deployment records, such as when a requested update does not apply to the requested edge device). In some embodiments, the request may include an identifier for the update. If the data required for the update (e.g., data records, images, containers, etc.) is locally available, the controller 1302 may retrieve the data required for the update from local memory. In some embodiments, if the data required for the update is not available, the controller 1302 may be configured to connect to cloud 1308 to request or otherwise obtain the required data for the update from cloud 1308. In some embodiments, the required data for the update may have been pushed or otherwise provided by the cloud 1308 prior to 1312 (e.g., via user request, via an automated update process, etc.). In these scenarios, the request 1310 may be initiated from a user interface hosted by controller 1302 that indicates the updates received from cloud 1308 is available.

At 1314, controller 1302 may transmit (e.g., via cluster controller 1006) the data needed to perform the update (e.g., a patch, an image, a container, a script, or the like).

At 1316, worker 1304 may receive (e.g., via worker controller 1008) the data provided by controller 1302. Worker 1304 may store the received data in local memory as being associated with the request and/or the update.

At 1318, worker 1304 may optionally respond with status data indicating that the data transmitted at 1314 was received.

At 1320, controller 1302 may transmit (e.g., via cluster controller 1006) instructions to worker 1304 instructing the worker 1304 to perform the update. In some embodiments, the instructions may include the data needed to perform the update (e.g., a patch, an image, a container, a script, or the like).

At 1322, the worker 1304 may execute operations for performing the requested update based at least in part on instructing its corresponding data plane components (e.g., data plane component(s) 1012) to perform applicable operations to apply the update. This may include, but is not limited to, executing a script or software package, installing an image, installing a patch, or the like received at 1314 and retrieved from local memory of worker 1304. In some embodiments, the data of 1314 and 1320 may be combined and worker 1304 may receive and immediately proceed to applying the update requested.

At 1324, worker 1304 may optionally respond with status data indicating that the request transmitted at 1320 was received.

At 1326, the worker 1304 may transmit status data indicating application of the update was successful or unsuccessful. If unsuccessful, worker 1304 may be configured to provide (e.g., via worker controller 1008 based on status provided by data plane component(s) 1012) an indication as to one or more reasons that the requested update was unsuccessful.

At 1328, controller 1302 may update its stored record based on receiving the data at 1326. If the status received from worker 1304 indicates that the requested update was unsuccessful, the controller 1302 may log the status as an update to the record associated with worker 1304 or potentially delete the record from storage. If the status received from worker 1304 indicates the requested deployment was successful, the controller 1302 may log the status in the record associated with worker 1304.

At 1330, controller 1302 (e.g., via cluster controller 1006) may present the status of the update to worker 1304 at a user interface hosted by controller 1302.

At 1332, and at any suitable time, the user may initiate a request via a user interface to view the status of any suitable requested update with respect to any suitable number of edge devices of the distributed computing cluster. At 1334, controller 1302 may respond to this request by presenting the current status corresponding to the updates for which status was requested. Responding to the request may include obtaining the status information from the stored record referred to at 1312 and 1328. While updates are in the process of being applied, the status of the requested update may indicate the update is in progress.

Figure 14:
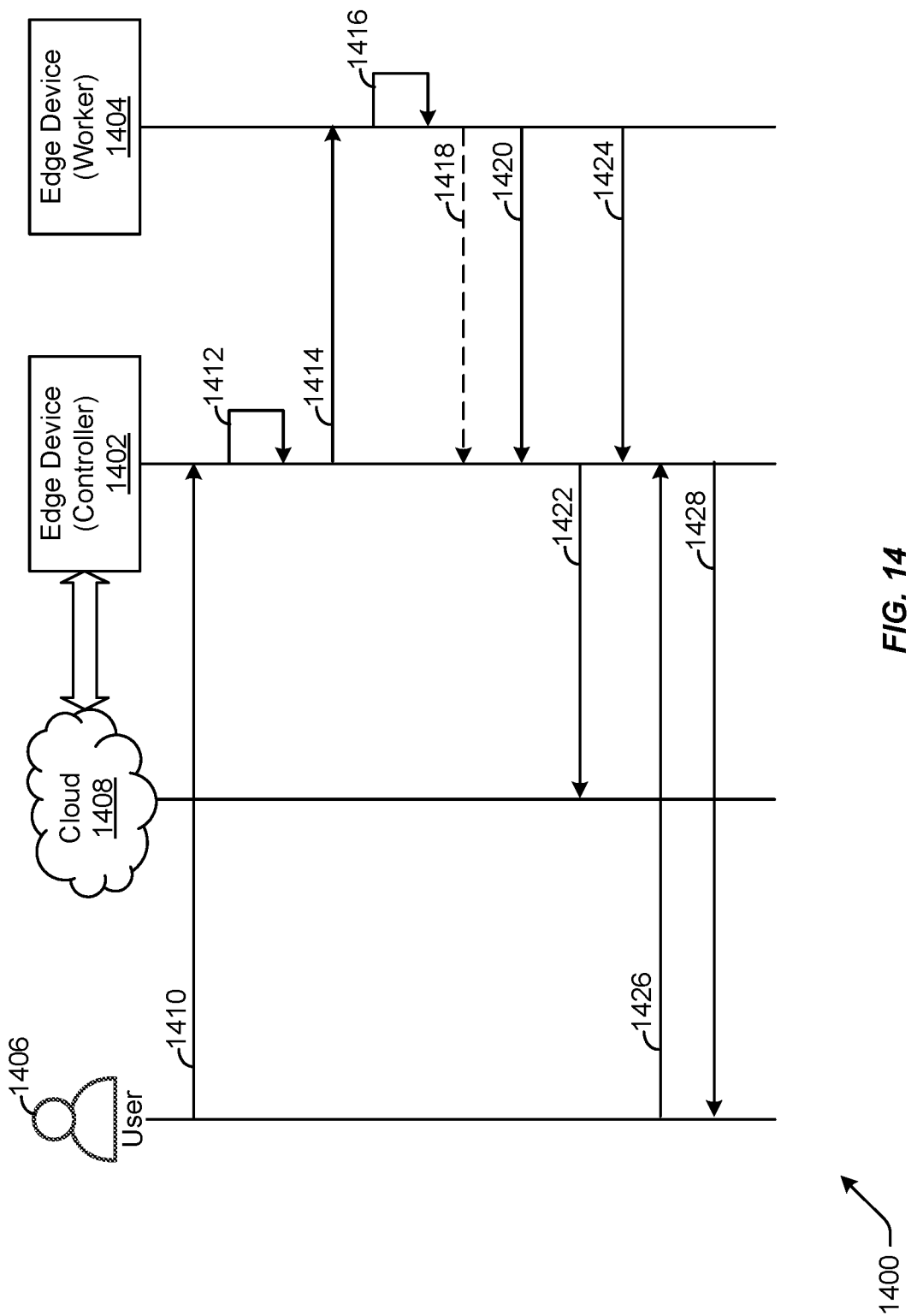
FIG. 14 is a flow diagram depicting an example method for synchronizing data from a disconnected edge device and a central cloud server, according to at least one embodiment.

FIG. 14 is a flow diagram depicting an example method 1400 for synchronizing data from one or more disconnected edge devices (e.g., edge device 1404) and a central cloud server (e.g., cloud 1408, representing one or more servers of a centralized cloud), according to at least one embodiment. In some embodiments, the edge device 1404 may be considered disconnected due to lacking a connection to cloud 1408. The edge devices 1402 and 1404 each may be an example of an edge device of a distributed computing cluster (e.g., the distributed computing cluster 600 of FIG. 6, the distributed computing cluster 1000 of FIG. 10, etc.). It is presumed that edge devices 1402 and 1404 have undergone the operations discussed in connection with FIG. 11 that configure each device with suitable control plane components (e.g., cluster controller 1006 and/or worker controller 1008 of FIG. 10) prior to the commencement of the operations discussed in connection with method 1300. For the purposes of the example of FIG. 14, edge device 1402 is presumed to be configured as a control plane device (also referred to as "controller 1402") that operates an instance of cluster controller 1006 and edge device 1404 is presumed to be configured as a data plane device (also referred to as a "worker 1304") that operates an instance of worker controller 1008.

The method 1400 may begin at 1410, where a request may be received (e.g., via user input provided by the user 1406 via an interface locally hosted by controller 1402 via cluster controller 1006 or another suitable control plane component). The request received at 1410 may indicate a request to synchronize data (e.g., data associated with a bucket) stored at one or more of the edge devices of a distributed computing cluster in which edge device 1402 participates and/or manages as part of a distributed control plane (e.g., the distributed control plane 1002 of FIG. 10). In some embodiments, the request may include or otherwise identify the data to be synchronized (e.g., uploaded to a corresponding storage location at the cloud 1408) to be applied. As a non-limiting example, the request may be for synchronization of a bucket managed by one or more data plane components of one or more edge devices (including edge device 1404). In some embodiments, the data may be replicated on multiple edge devices (e.g., edge device 1404) of the computing cluster for redundancy.

At 1412, controller 1402 may perform operations for identifying edge devices to which the synchronization applies, or the like. If the request does not specify particular workers to which the synchronization applies, the controller 1402 may identify, from previously stored records, all workers and/or controllers of the cluster that are associated with the data to be synchronized. This may include identifying that edge device 1404 is associated with the bucket identified in the request. If the request includes corresponding identifiers for one or more respective edge devices, the controller 1202 may forgo operations directed to using stored data (e.g., a mapping identifying storage locations for respective data stored throughout the cluster) to identify edge devices. In some embodiments, the controller 1402 may selectively request the data from one of the edge devices identified as storing the data. In some embodiments, the controller 1402 may request the data from all edge devices identified as being associated with the data (e.g., based at least in part on an association to the bucket).

At 1414, controller 1402 may transmit (e.g., via cluster controller 1006) a request to worker 1404 to request synchronization. In some embodiments, the request may include an identifier for the data to be synchronized. The request may an identifier for controller 1402 indicating a destination for the data transmitted by worker 1404 is controller 1402. In some embodiments, the controller 1402 may forgo the operations at 1414 and may broadcast the request to all edge devices of the cluster to solicit the data from any edge device of the cluster.

At 1416, the worker 1304 may execute operations for identifying (e.g., by data plane component(s) 1012) whether the requested data is stored at one or more data plane resources it hosts. In some embodiments, if the data is identified as being stored at corresponding data plane resources, the worker 1404 may optionally respond with an indication that the request was successful at 1418.

At 1420, the worker 1404 may transmit at least a portion of the data for which synchronization was requested. In some embodiments, the worker 1404, depending on the size of the data, may transmit portions of the data over time, such as by transmitting a stream of data.

At 1422, the controller 1402 may be configured to transmit the data received at 1420 to cloud 1408. In some embodiments, the controller 1402 may be configured to utilize an in-memory data copy with storing the data to persistent local storage.

At 1424, the worker 1404 may transmit status data indicating the synchronization has been completed and/or interrupted. If interrupted, worker 1404 may be configured to provide (e.g., via worker controller 1008 based on status provided by data plane component(s) 1012) an indication as to one or more reasons that the synchronization was interrupted. The controller 1402 may store the status data associated with the synchronization. At any suitable time, the controller 1402 may present the status data to the user via a user interface.

By way of example, at 1426, or at any suitable time, the user may initiate a request via a user interface to view the status of any suitable synchronization request (e.g., the request initiated at 1412). At 1428, controller 1402 may respond to this request by presenting the current status corresponding to the synchronization for which status was requested. Responding to the request may include obtaining the status information from the status data stored at 1424.

Figure 15:
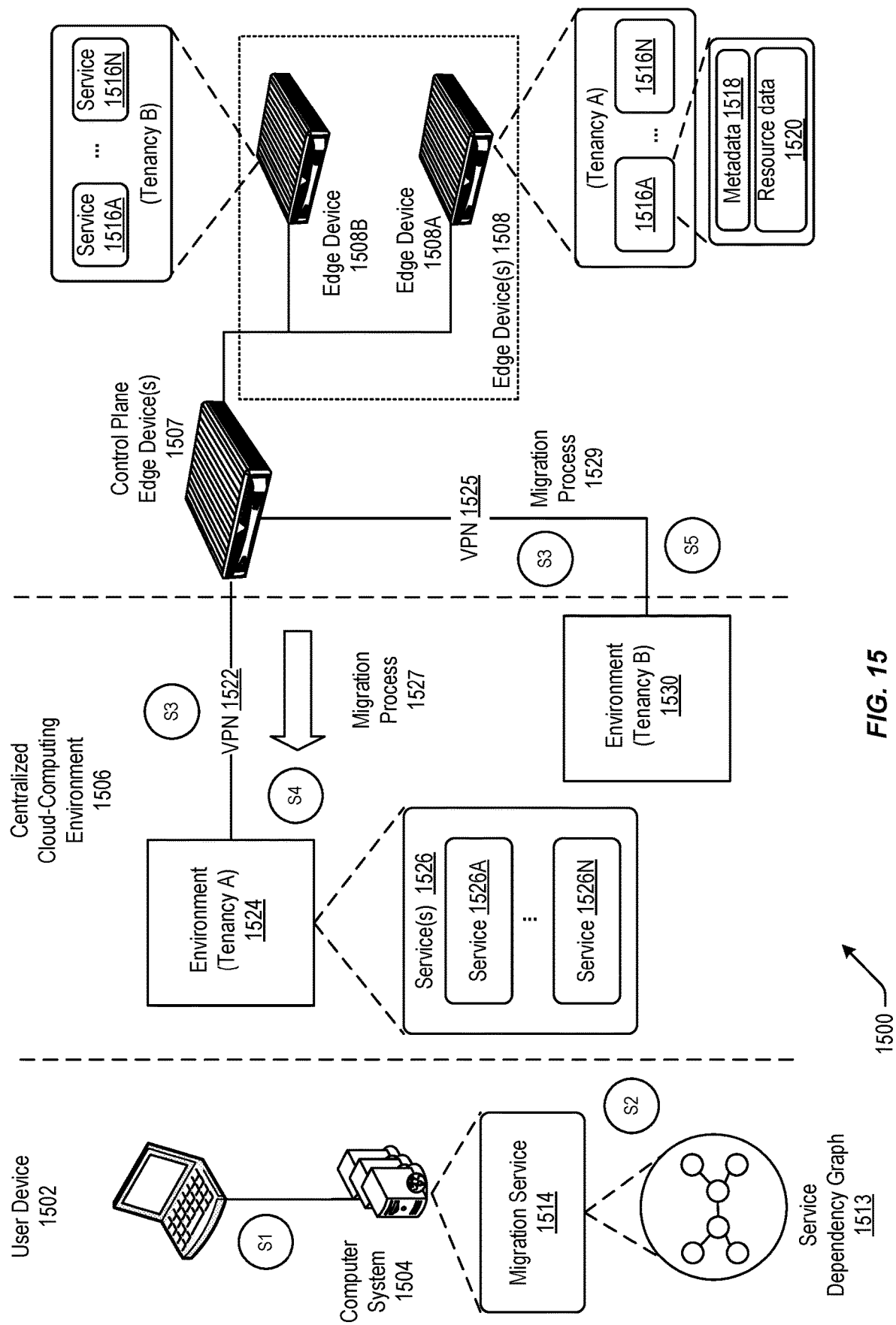
FIG. 15 is a block diagram illustrating an example environment and method for synchronizing/migrating a resource or any suitable data between one or more edge devices and a cloud computing environment, in accordance with at least one embodiment.

FIG. 15 is a block diagram illustrating an example environment 1500 for synchronizing/migrating a resource (e.g., a service, metadata, resource data, etc.) or any suitable data between one or more edge devices (or virtual edge device) and a cloud computing environment, in accordance with at least one embodiment. The terms "synchronizing," or "migrating," are intended to refer to any suitable transfer of data between an edge device (or a virtual edge device) and the cloud computing environment 1506. Although the example of FIG. 15 is provided in one direction, it should be appreciated that similar techniques may be employed to transfer data from a cloud-computing environment (e.g., centralized cloud-computing environment 1506) to an edge device and/or virtual edge device. In some embodiments, the data may be transferred between source and destination locations that are associated with a common tenancy and/or compartment.

FIG. 15 depicts several elements, including user device 1502 (e.g., a laptop, PC, etc.), computer system 1504 (e.g., a server device), a centralized cloud-computing environment 1506 (a centralized cloud), control plane edge device(s) 1507, and edge device(s) 1508 (e.g., including edge device 1508A and edge device 1508B, each of which may correspond to any of the edge devices described in reference to FIGS. 1-7 and/or virtual edge devices of FIGS. 8 and/or 9). The control plane edge device(s) 1507 may be an example of the edge devices of FIGS. 1-7 or a virtual edge device of FIGS. 8 and 9 that is configured to operate a portion of a control plane. In some embodiments, the control plane edge device(s) 1507 may implemented by a single device or the control plane edge device may be one of any suitable number of control plane edge devices that implement a distributed control plane (e.g., the distributed control plane 1002 of FIG. 10). In some embodiments, the control plane edge device(s) 1507 may correspond to node 1 and/or node 2 of distributed control plane 1002 of FIG. 10. Each of the edge device(s) 1508 may be configured with any suitable number of virtual edge devices, each being an example of the virtual edge devices of FIGS. 8 and 9. Thus, in some embodiments, synchronizing data as discussed with respect to edge devices in the example below may be similarly applied to synchronizing data with respect to virtual edge devices. Any suitable operations performed with or by an edge device, may be similarly performed with or by a virtual edge device. In the illustration of FIG. 15, computer system 1504 and centralized cloud-computing environment 1506 may be associated with and/or managed by a cloud services provider.

As described further herein, the elements of FIG. 15 are depicted in association with performance of one or more operations of a migration process. For example, at step S1 of FIG. 15, a migration service 1514 of computer system 1504 may receive a request (e.g., from user device 1502, which may be associated with a particular customer of a cloud service provider) to migrate resources such as services, virtual machine instances ("instances," for brevity), workloads, state data, metadata, or the like, that currently reside at one or more edge device(s) 1508. In any of the examples provided herein, any reference to migrating one or more resources can equally apply to migrating instances, services, workloads, objects, files, state data, metadata, or any other transferable data entity, irrespective of whether such resources are service related. In some embodiments, the migration request may additionally or alternatively be received from any suitable combination of the edge device(s) 1508 or control plane edge device(s) 1507.

The edge device(s) 1508 may be provisioned to the particular customer for use in executing customer workloads via one or more resources. Using edge device 1508A as a representative example of the one or more edge device(s)

1508, edge device 1508A may execute one or more services (e.g., service 1516A-1516N). In some embodiments, a service (e.g., service 1516A, being a representative service) may be associated with, among other data elements/resources, metadata 1518 (e.g., including policy settings, access controls, etc.) and resource data 1520 (e.g., including files, folders, and/or other data objects). In some embodiments, a resource may be associated with any suitable computing workloads (e.g., hosting a web server to process web traffic, executing a machine learning algorithm to analyze data, storing customer data records, etc.). In some embodiments, a particular edge device (e.g., edge device 1508A) may be associated with a particular hardware profile. For example, a hardware profile may indicate a number of CPU cores (e.g., 40 CPU cores) and/or a number of memory units (e.g., 512 Gigabytes). It should be understood that any suitable features may be associated with a hardware profile, including, but not limited to, CPU resources, memory resources, data bus types, disk storage types, network card types, other processor types (e.g., GPU resource), etc. A particular hardware profile of an edge device may enable the edge device to process data in accordance with workload requirements. For example, a particular processor unit type may enable efficient processing of data (e.g., images, video, etc.) by the edge device.

As described above, in some embodiments, edge device(s) 1508 may include any suitable number of edge devices. The edge device(s) 1508 and the control plane edge device(s) 1507 may collectively operate as a distributed computing cluster (e.g., connected together over a VPN), for example, similar to distributed computing cluster 600. In some embodiments, any suitable combination of the edge device(s) 1508 and/or control plane edge device(s) 1507 of FIG. 15 may be a virtual edge device operating on the same or different edge devices and may implement a distributed computing cluster of virtual edge devices (e.g., distributed computing cluster 904 of FIG. 9). In some embodiments, virtual edge devices may be used to execute an increased number of workloads among the devices of the cluster. In some embodiments, one or more services may be executed by each edge device (and/or on each virtual edge device) to execute the workloads, and the services may (or may not) coordinate with each other.

In some embodiments, each edge device (and/or virtual edge device) may be associated with a same, or potentially differing, compartments/tenancies of the customer. As depicted in FIG. 15, edge devices 1508A and 1508B are associated with "Tenancy A" and "Tenancy B," respectively. In some embodiments, some number of the virtual edge devices of any suitable number of edge device(s) 1508 may operate as a distributed computing cluster and may be used to execute an even further increased number of workloads among the virtual devices of the cluster and, by extension, the edge device(s) 1508.

In some embodiments, an edge device (and/or a virtual edge device, and/or a cluster of edge devices and/or virtual edge devices) may be associated with (e.g., belong to) a particular namespace. In some embodiments, a namespace may indicate a taxonomy for configuration data identities such that, for a particular namespace the identities are unique within the particular namespace. In some embodiments, the namespace may further be associated with (e.g., and/or provide a taxonomy for) any suitable data objects (e.g., VMs, files, etc.), relationships between objects, policies, resource data, attributes, identifiers, and the like, within the namespace.

Control plane edge device(s) 1507 may be configured to coordinate migration for edge device(s) 1508. In some embodiments, a request to migrate data from one or more of the edge device(s) 1508 may be initiated at user device 1502. Alternatively, the request to migrate one or more if the edge device(s) 1508 may be received at any of the edge device(s) 1508 or at the control plane edge device(s) 1507 and transmitted (e.g., by the control plane edge device(s) 1507) to migration service 1514 to a request migrating data from the edge device(s) (e.g., edge device 1508A). In some embodiments, the control plane edge device(s) 1507 may issue the request prior to having obtained the data to be migrated from the edge device(s) 1508, or the control plane edge device(s) 1507 may obtain the data to be migrated from the edge device(s) 1508 prior to transmitting the request. In some embodiments, upon receiving the request to migrate services (and/or resources), migration service 1514 may obtain (e.g., access) a manifest file associated with the edge device(s) (and/or virtual edge device(s)) for which migration was requested at step S2). The manifest file may identify information associated with the edge device(s) 1508 that may be used by the migration service 1514 to determine instructions for coordinating the service migration process. In some embodiments, the manifest file may indicate a list of resources (e.g., an inventory list) that are currently deployed to the edge device(s) 1508. It should be understood that any suitable information about the edge device(s) 1508 (or virtual edge devices) may be obtained to coordinate the migration process. The information may be obtained at any suitable time during the service migration process (e.g., upon receiving the request, after establishing a connection and/or private network (e.g., virtual private network (VPN) 1522 and/or 1524, etc.).

At step S3, the migration service 1514 may establish a communication channel between the control plane edge device(s) 1507 (e.g., a control edge device associated with the edge device 1508A) and the environment 1524. Environment 1524 is intended to depict any suitable centralized cloud-computing resource corresponding to the resources to be migrated from the edge device(s) 1508 (e.g., edge device 1508A). By way of example, based at least in part on identifying (e.g., from the manifest), that edge device 1508A is associated with "Tenancy A," the migration service 1504 may at least initiate a process by which a communication channel (e.g., VPN 1522) is established between a resource operating at the edge device (e.g., service 1516A), and a corresponding centralized resource (e.g., service 1526A of Environment 1524, a resource that corresponds to the service 1516A and the tenancy "Tenancy A"). In some embodiments, migration service 1514 may establish the communication connection (e.g., VPN 1522) between control plane edge device(s) 1507 and centralized cloud-computing environment 1506 based on identifying that the control plane edge device(s) 1507 operates as a control plane device of a single or distributed control plane associated with edge device 1508A. It should be understood that the communication channels discussed above may utilize any suitable one or more networks and/or mediums (e.g., the Internet, a private network, a WiFi network, Ethernet, etc.). In some embodiments, a different communication channel may be established between the virtual bootstrap environment and each of the edge device(s) 1508 being migrated.

At step S4, the migration service 1514 may execute a set of migration operations to coordinate the process for migrating resources (e.g., migration process 1527) between edge device 1508A and environment 1524 (e.g., over the VPN 1522). For example, the migration service 1514 may generate a service dependency graph 1513 that indicates an ordering of services that are to be eventually deployed environments 1524 and/or 1530. In some embodiments, the service dependency graph 1513 may include a directed acyclic graph (DAG) of service dependencies. In some embodiments, as described above, the dependency graph may (or may not) include one or more of the core set of services of the centralized cloud-computing environment 1506. In some embodiments, the service dependency graph 1513 may include nodes for services that have a counterpart service on edge devices and/or virtual edge devices being migrated. The dependency graph may further include nodes for additional services that do not have a counterpart service being migrated. In this way, the migration service 1514 may ensure that each service is ready to be deployed at the appropriate time/order (e.g., when other dependent services have been deployed). In some embodiments, the service dependency graph 1513 may (or may not) differentiate between services that are being migrated and those that do not have a migrating counterpart. In some embodiments, the information used to generate the service dependency graph 1513 may be obtained from one or more sources. For example, the service dependency graph 1513 may be generated based in part on a manifest file received from the edge device(s) 1508 (or virtual edge device(s)) from the control plane edge device(s) 1507, from centralized cloud storage, and/or from a centralized cloud service (e.g., based at least in part on determining the manifest file corresponds to the edge device(s)/virtual edge device(s) to be migrated). The manifest may indicate what particular resources (e.g., services, metadata, resource data, etc.) are to be migrated. In some embodiments, the service dependency graph 1513 may be used to drive an order by which the resources (e.g., metadata 1518, resource data 1520, etc.) are migrated.

In some embodiments, following the generation of the service dependency graph 1513, the set of migration operations may include facilitating a migration of each resource of the first set of services (and/or corresponding resources). In some embodiments, facilitating the migration may include transmitting (e.g., to the control plane edge device(s) 1507) a request for a particular resource migration (e.g., to migrate metadata 1518 and/or resource data 1520). In some embodiments, the control plane edge device(s) 1507 may be configured to, upon receipt of a request for migrating a particular resource (e.g., resource data 1520) of a particular edge device (e.g., edge device 1508A or a virtual edge device of edge device 1508A) may transmit a request to the edge device 1508A. Receipt of this request may cause the edge device 1508A to transmit the requested data (e.g., resource data 1520) to control plane edge device(s) 1507. Control plane edge device(s) 1507 may in turn transmit the data received from edge device 1508A using VPN 1522. In some embodiments, control plane edge device(s) 1507 may not store the data received from edge device 1508A, rather, in some cases, the control plane edge device(s) 1507 may perform an in-memory transfer of the data received from edge device 1508A. In some embodiments, the request from migration service 1514 may correspond to a resource that spans across edge devices (e.g., an object storage bucket that spans edge device 1508A and 1508B). In some embodiments, the control plane edge device(s) 1507 may be configured to identify, upon receipt of the request, which edge devices (and/or virtual edge device) to which the request relates and transmit a request to each of the identified edge devices (or virtual edge devices).

The migration service 1514 may iterate through each resource according to the service dependency graph 1513 until all of the resources have been migrated from each edge device/virtual edge device (e.g., edge device 1508A), to its corresponding resource (e.g., service 1526A) within the corresponding environment (e.g., environment 1524 associated with Tenancy A). In some embodiments, a validation process may be performed upon migrating services/resources to a virtual bootstrap environment before migrating the services/resources to a dedicated region.

At step S5, similar operations may be performed as part of migration process 1529, a migration process corresponding to edge device 1508B (and/or virtual edge device of the edge device 1508B). By way of example, the resources of edge device 1508B may be migrated by control plane edge device(s) 1507 to environment 1530 via VPN 1525. In some embodiments, the operations of migration processes 1527 and 1529 may be performed sequentially, or at least in part, concurrently.

In some embodiments, a validation process may be performed upon completion of the migration process 1527 and/or 1529 (and/or each migration), to ensure that resource has been successfully migrated. Upon completing the end-to-end validation process, the migration service 1514 may perform any suitable actions. For example, the migration service 1514 may cause the respective edge device (e.g., edge device 1508A and/or edge device 1508B) to be shut down (and/or decommissioned) (e.g., through transmission of a command to shut down). In some embodiments, the migration service 1514 may shut down a particular resource (e.g., one of the set of services) on the edge device (e.g., via transmission of a command to shut down that particular service), once the service is confirmed to be successfully migrated.

Figure 16:
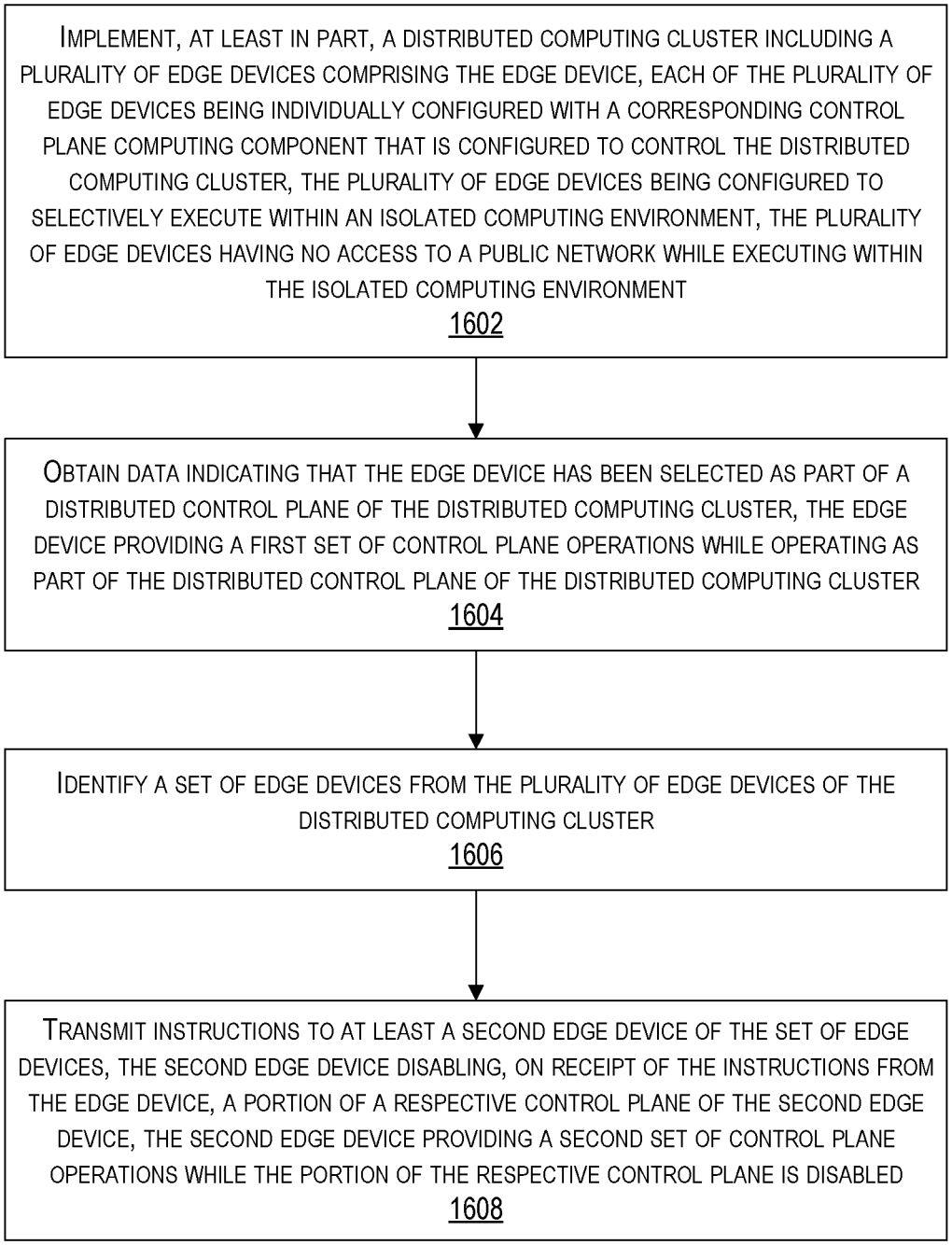
FIG. 16 is a block diagram illustrating an example method for processing a request for virtual resource by a distributed computing cluster, in accordance with at least one embodiment.

FIG. 16 is a block diagram illustrating an example method 1600 for configuring a control plane of a distributed computing cluster, in accordance with at least one embodiment. The operations of method 1600 may be performed in any suitable order. Although a particular number of operations are illustrated, the method 1600 may include more or fewer operations than those depicted. In some embodiments, the method 1600 may be performed by an edge device (e.g., edge device 500 of FIG. 5). The edge device may be operating as a computing node of a distributed computing cluster (e.g., distributed computing cluster 600 of FIG. 6, distributed computing cluster 904 of FIG. 9). Although the example of FIG. 16 is directed to a distributed computing cluster of edge devices, the same or substantially similar techniques may be utilized to configure a control plane of a distributed computing cluster of virtual edge devices. In some embodiments, the control plane may be distributed over multiple edge devices/virtual edge devices of the cluster.

The method 1600 may begin at 1602, where a distributed computing cluster (e.g., distributed computing cluster 600 of FIG. 6, distributed computing cluster 904 of FIG. 9, distributed computing cluster 1000 of FIG. 10, etc.) including a plurality of edge devices comprising the edge device may be implemented. In some embodiments, each of the plurality of edge devices may be individually configured with a corresponding control plane computing component (e.g., cluster controller 1006 of FIG. 6) that is configured to control the distributed computing cluster. In some embodiments, the plurality of edge devices may be configured to selectively execute within an isolated computing environment during which the plurality of edge devices may have no access to a public network. Thus, each of the plurality of edge devices may be configured to execute various instances and/or workloads remotely (e.g., at a location separate from the location of the centralized cloud) while having no public connection (e.g., to the centralized cloud or otherwise).

At 1604, data indicating that the edge device has been selected as part of a distributed control plane of the distributed computing cluster may be obtained. In some embodiments, the data may be identified from a manifest and/or other configuration data specifying roles of each edge device of the distributed computing cluster. In some embodiments, the data may specify (e.g., by identifier(s) associated with the corresponding edge device(s)) which edge devices are to be configured as control plane devices (e.g., configured to execute an instance of cluster controller 1006 of FIG. 1) and/or which edge devices are to be configured to operate as data plane devices (e.g., configured to execute an instance of worker controller 1008 of FIG. 10). In some embodiments, the edge device provides a first set of control plane operations while operating as part of the distributed control plane of the distributed computing cluster. The edge device may be reconfigured during a manufacturing process and/or the edge device may configure itself (e.g., by shutting down, suspending, or otherwise removing worker controller 1008) upon determining it has been identified as a control plane device in the manifest/configuration data.

At 1606, a set of edge devices may be identified (e.g., by the edge device 1102 of FIG. 11) from the plurality of edge devices of the distributed computing cluster. In some embodiments, the edge device may identify all other edge devices of the cluster. Identifying the other edge devices may include identifying, from the manifest/configuration data, a role for each edge device (e.g., control plane device and/or data plane device, controller and/or worker, etc.).

At 1608, the edge device (e.g., the cluster controller 1006 of edge device 1102) may transmit instructions to at least a second edge device of the set of edge devices (e.g., edge device 1202 of FIG. 2). In some embodiments, the second edge device may disable (e.g., on receipt of the instructions from the edge device or at any suitable time) a portion of a respective control plane of the second edge device (e.g., an instance of cluster controller 1006 with which edge device 1104 was initially configured). In some embodiments, the second edge device may provide a second set of control plane operations (e.g., the functionality described above in connection with worker controller 1008) while the portion of the respective control plane (e.g., cluster controller 1006) is disabled.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    implementing, at least in part by a first edge device, a distributed computing cluster including a plurality of edge devices comprising the first edge device, the plurality of edge devices being configured to selectively execute within an isolated computing environment with no access to a public network while executing within the isolated computing environment, each of the plurality of edge devices being individually configured with;
        a cluster control plane computing component comprising a first container or instance that is configured to control instances or containers across the distributed computing cluster using a first set of functionalities; and
        a worker computing component comprising a second container or instance that provides a limited set of functionalities to control aspects of instances and containers executing at a single edge device, the limited set of functionalities being a subset of the first set of functionalities including less functionalities than the first set of functionalities;
    obtaining, by the first edge device, data indicating that the first edge device has been selected as part of a distributed control plane of the distributed computing cluster, the first edge device providing a first set of control plane operations while operating as part of the distributed control plane of the distributed computing cluster;
    identifying, by the first edge device, a set of edge devices from the plurality of edge devices of the distributed computing cluster; and
    transmitting, by the first edge device, instructions to at least a second edge device of the set of edge devices that configure the second edge device as a worker node of the distributed computing cluster, the second edge device disabling, on receipt of the instructions from the first edge device, the cluster control plane computing component at the second edge device, the second edge device being configured, through the disabling of the cluster control plane computing component, to disable the first set of functionalities and to provide the limited set of functionalities while operating as the worker node.

2. The computer-implemented method of claim 1, wherein obtaining the data indicating that the first edge device has been selected to operate as part of the distributed control plane of the distributed computing cluster comprises at least one of: 1) obtaining the data from local memory of the first edge device, or 2) receiving, from a user interface hosted by the first edge device, user input comprising the data.

3. The computer-implemented method of claim 1, further comprising:
    receiving, by the first edge device operating as part of the distributed control plane, a request to launch a new container or instance on the second edge device of the set of edge devices; and
    transmitting, by the first edge device, additional instructions to the second edge device to launch the new container or instance, the second edge device being configured to execute corresponding operations to launch the new container or instance in response to receiving the additional instructions.

4. The computer-implemented method of claim 1, further comprising:
    receiving, by the first edge device operating as part of the distributed control plane, a request to synchronize second data stored in memory at the second edge device;
    requesting, by the first edge device from the second edge device, the second data stored in the memory at the second edge device;
    receiving, by the first edge device, the second data stored in the memory at the second edge device; and
    transmitting, by the first edge device to a central cloud server, the second data received from the second edge device.

5. The computer-implemented method of claim 1, wherein the first edge device, while operating as part of the distributed control plane, periodically connects via the public network to one or more central cloud servers of a centralized cloud environment.

6. The computer-implemented method of claim 1, further comprising:
    receiving, by the first edge device operating as part of the distributed control plane, a request to perform an update at the second edge device;
    transmitting, by the first edge device to the second edge device via the cluster control plane computing component executing at the first edge device, update data that is associated with performing the update at the second edge device; and
    transmitting, by the first edge device to the second edge device via the cluster control plane computing component executing at the first edge device, update instructions, the second edge device being configured to perform the update in response to receiving the update instructions and in accordance with the update data received from the first edge device.

7. The computer-implemented method of claim 1, wherein configuring the second edge device as the worker node allows the second edge device to intermittently operate in a disconnected mode in which the second edge device manages previously initiated workflows while lacking network connection to all other edge devices of the plurality of edge devices that are currently configured to execute the first set of functionalities.

8. The computer-implemented method of claim 1, wherein the second edge device, while operating as the worker node of the distributed computing cluster, lacks corresponding functionality associated with connecting to a centralized cloud environment.

9. An edge device, comprising:
one or more processors; and
one or more memories configured with computer-executable instructions that, when executed by the one or more processors, causes the edge device to:
  implement, at least in part, a distributed computing cluster including a plurality of edge devices comprising the edge device, the plurality of edge devices being configured to selectively execute within an isolated computing environment with no access to a public network while executing within the isolated computing environment, each of the plurality of edge devices being individually configured with:
    a cluster control plane computing component comprising a first container or instance that is configured to control instances or containers across the distributed computing cluster using a first set of functionalities; and
    a worker computing component comprising a second container or instance that provides a limited set of functionalities to control aspects of instances and containers executing at a single edge device, the limited set of functionalities being a subset of the first set of functionalities including less functionalities than the first set of functionalities;
  obtain data indicating that the edge device has been selected as part of a distributed control plane of the distributed computing cluster, the edge device providing a first set of control plane operations while operating as part of the distributed control plane of the distributed computing cluster;
  identify a set of edge devices from the plurality of edge devices of the distributed computing cluster; and
  transmit instructions to at least a second edge device of the set of edge devices that configure the second edge device as a worker node of the distributed computing cluster, the second edge device disabling, on receipt of the instructions from the edge device, the cluster control plane computing component at the second edge device, the second edge device being configured, through the disabling of the cluster control plane computing component, to disable the first set of functionalities and to provide the limited set of functionalities while operating as the worker node.

10. The edge device of claim 9, wherein obtaining the data indicating that the edge device has been selected to operate as part of the distributed control plane of the distributed computing cluster comprises at least one of: 1) obtaining the data from local memory of the edge device, or 2) receiving, from a user interface hosted by the edge device, user input comprising the data.

11. The edge device of claim 9, wherein executing the computer-executable instructions further causes the edge device to:
  receive, while operating as part of the distributed control plane, a request to launch a new container or instance on the second edge device of the set of edge devices; and
  transmit additional instructions to the second edge device to launch the new container or instance, the second edge device being configured to execute corresponding operations to launch the new container or instance in response to receiving the additional instructions.

12. The edge device of claim 9, wherein executing the computer-executable instructions further causes the edge device to:
  receive, while operating as part of the distributed control plane, a request to synchronize second data stored in memory at the second edge device;
  request, from the second edge device, the second data stored in the memory at the second edge device;
  receive the second data stored in the memory at the second edge device; and
  transmit, to a central cloud server, the second data received from the second edge device.

13. The edge device of claim 9, wherein the edge device, while operating as part of the distributed control plane, periodically connects via the public network to one or more central cloud servers of a centralized cloud environment.

14. The edge device of claim 9, wherein executing the computer-executable instructions further causes the edge device to:
  receive, while operating as part of the distributed control plane, a request to perform an update at the second edge device;
  transmit, to the second edge device via the cluster control plane computing component executing at the edge device, update data that is associated with performing the update at the second edge device; and
  transmit, to the second edge device via the cluster control plane computing component executing at the edge device, update instructions, the second edge device being configured to perform the update in response to receiving the update instructions and in accordance with the update data received from the edge device.

15. A non-transitory computer-readable medium comprising computer-executable instructions that, when executed with one or more processors of an edge device, causes the edge device to:
  implement, at least in part, a distributed computing cluster including a plurality of edge devices comprising the edge device, the plurality of edge devices being configured to selectively execute within an isolated computing environment with no access to a public network while executing within the isolated computing environment, each of the plurality of edge devices being individually configured with:
    a cluster control plane computing component comprising a first container or instance that is configured to control instances or containers across the distributed computing cluster using a first set of functionalities; and
    a worker computing component comprising a second container or instance that provides a limited set of functionalities to control aspects of instances and containers executing at a single edge device, the limited set of functionalities being a subset of the first set of functionalities including less functionalities than the first set of functionalities;
  obtain data indicating that the edge device has been selected as part of a distributed control plane of the distributed computing cluster, the edge device providing a first set of control plane operations while operating as part of the distributed control plane of the distributed computing cluster;
  identify a set of edge devices from the plurality of edge devices of the distributed computing cluster; and
  transmit instructions to at least a second edge device of the set of edge devices that configure the second edge device as a worker node of the distributed computing cluster, the second edge device disabling, on receipt of the instructions from the edge device, the cluster control plane computing component at the second edge device, the second edge device being configured, through the disabling of the cluster control plane computing component, to disable the first set of functionalities and to provide the limited set of functionalities while operating as the worker node.

16. The non-transitory computer-readable medium of claim 15, wherein obtaining the data indicating that the edge device has been selected to operate as part of the distributed control plane of the distributed computing cluster comprises at least one of: 1) obtaining the data from local memory of the edge device, or 2) receiving, from a user interface hosted by the edge device, user input comprising the data.

17. The non-transitory computer-readable medium of claim 15, wherein executing the computer-executable instructions further causes the edge device to:
receive, while operating as part of the distributed control plane, a request to launch a new instance on the second edge device of the set of edge devices; and
transmit additional instructions to the second edge device to launch the new instance, the second edge device being configured to execute corresponding operations to launch the new instance in response to receiving the additional instructions.

18. The non-transitory computer-readable medium of claim 15, wherein executing the computer-executable instructions further causes the edge device to:
receive, while operating as part of the distributed control plane, a request to synchronize second data stored in memory at the second edge device;
request, from the second edge device, the data stored in the memory at the second edge device;
receive the data stored in the memory at the second edge device; and
transmit, to a central cloud server, the data received from the second edge device.

19. The non-transitory computer-readable medium of claim 15, wherein the edge device, while operating as part of the distributed control plane, periodically connects via the public network to one or more central cloud servers of a centralized cloud environment.

20. The non-transitory computer-readable medium of claim 15, wherein executing the computer-executable instructions further causes the edge device to:
receive, while operating as part of the distributed control plane, a request to perform an update at the second edge device;
transmit, to the second edge device via the cluster control plane computing component executing at the edge device, update data that is associated with performing the update at the second edge device; and
transmit, to the second edge device via the cluster control plane computing component executing at the edge device, update instructions, the second edge device being configured to perform the update in response to receiving the update instructions and in accordance with the update data received from the edge device.

* * * * *

UNITED STATES PATENT AND TRADEMARK OFFICE
CERTIFICATE OF CORRECTION

| | |
|---|---|
| PATENT NO. | : 12,355,619 B2 |
| APPLICATION NO. | : 18/331900 |
| DATED | : July 8, 2025 |
| INVENTOR(S) | : Vasanad et al. |

It is certified that error appears in the above-identified patent and that said Letters Patent is hereby corrected as shown below:

In the Specification

In Column 22, Line 67, delete "In some embodiments, In some" and insert -- In some --, therefor.

In Column 26, Line 19, delete "that that" and insert -- that --, therefor.

In the Claims

In Column 39, Line 29, in Claim 1, delete "with;" and insert -- with: --, therefor.

Signed and Sealed this
Fourteenth Day of October, 2025

John A. Squires
*Director of the United States Patent and Trademark Office*